US005798949A

United States Patent [19]

Kaub

[11] Patent Number: 5,798,949

[45] Date of Patent: Aug. 25, 1998

[54] TRAFFIC SAFETY PREDICTION MODEL

[76] Inventor: Alan Richard Kaub, 9924 Hawthorn Hill Ct., Manassas, Va. 22111

[21] Appl. No.: 689,651

[22] Filed: Aug. 9, 1996

Related U.S. Application Data

[63] Continuation-in-part of Ser. No. 372,336, Jan. 13, 1995, abandoned.

[51] Int. Cl.[6] .......... G06F 17/00

[52] U.S. Cl. .......... 364/578; 364/701

[58] Field of Search .......... 364/578, 436, 364/437, 438; 340/995, 905

[56] References Cited

U.S. PATENT DOCUMENTS

| | | | |
|---|---|---|---|
| 4,179,739 | 12/1979 | Virnot | 364/436 |
| 5,251,161 | 10/1993 | Gioutsos et al. | 364/578 |
| 5,270,708 | 12/1993 | Kamishima | 340/995 |

FOREIGN PATENT DOCUMENTS

| | | | |
|---|---|---|---|
| 658-575 | 4/1979 | U.S.S.R. | G06G 7/48 |

OTHER PUBLICATIONS

Jason C. Yu, *Establishing Relationship of Level of Service and Highway Safety*, Oct. 1972.

Dickinson, et al. *An Evaluation of Microwave Vehicle Detection at Traffic Signal Controlled Intersections*, May 1, 1990, pp. 153–157.

Favilla et al., *Fuzzy Traffic Control: Adaptive Strategies*, Mar. 28, 1993, pp. 506–511.

Harris, *The Development and Deployment of IVHS in North America*, Aug. 31, 1994, pp. 3–10.

Bielefeldt et al., *Motion—A New On-Line Traffic Signal Network Control System*, Apr. 26, 1994, pp. 55–59.

Kotz et al., *Educated Guessing*, (no month) 1983, p. 22.

Hoyer et al., *Fuzzy Control of Traffic Lights*, Jun. 26, 1994, pp. 1526–1531.

Lee et al., *Development and Assessment of a Traffic Adaptive Control System in Korea*, Aug. 31, 1994, pp. 203–208.

Petzold et al., *Potential for Geographic Information Systems in Transportation Planning and Highway Infrastructure Management*, (no month) 1990, pp. 1–9.

Saito et al., *Dilemma and Option Zones, the Problem of Countermeasures*, May 1, 1990, pp. 137–141.

Gantz, Flow Profile Comparison of a Microscopic Car-Following Model and a Macroscopic Platoon Dispersion Model for Traffic Simulation, IEEE, pp. 770–774, Dec. 1990.

Wey et al. A Local Feedback Controller for Oversaturated Intersection Control Based on Dynamic Road Traffic Models, IEEE, pp. 172–178, Jul. 1995.

Han et al, Real-Time Control of Traffic with Bus and Streetcar Interactions, IEEE, pp. 108–112, Apr. 1992.

*Primary Examiner*—Kevin J. Teska
*Assistant Examiner*—Matthew Loppnow
*Attorney, Agent, or Firm*—Richard C. Litman

[57] ABSTRACT

The present invention provides an Traffic Safety prediction Computer Program (TRAF-SAFE) and sub-models for predicting the number of accidents, injuries and fatalities expected annually at an intersection or series of intersections based on the particular intersection and roadway features. A finite analysis approach to an intersection is used to break the intersection into discrete elements such as lanes, turnbays, stop control signals, and traffic flow rates. The total annual expected accidents can then be calculated as a summation of the interrelation of the individual elements. A Poisson's distribution is used to statistically estimate the likelihood of the individual vehicles occurring within a discrete time frame being investigated. The conflict probabilities between various permutations of the traffic flow is then calculated and summed to determine the number of conflicts for the intersection or roadway. The conflicts are then converted to expected accidents, and the accident level is converted to injury involvements and Safety Levels of Service for the intersection and roadway.

22 Claims, 24 Drawing Sheets

ACCIDENT SEVERITY BY TRAVEL SPEED

VARIATION OF OCCUPANT INJURY/KILL RATIO WITH VEHICLE TRAVEL SPEED

STOP CONTROLLED HIGHWAY CAPACITY (HCM) AND SAFTY LEVELS OF SERVICE FOR THE MUTCD EXAMPLES

| | Case 1 | Case 2 | Case 3 | Case 4 | Case 5 | Case 6 | Case 7 | Case 8 | Case 9 | Case 10 | Case 11 | Case 12 | Case 13 | Averages |
|---|---|---|---|---|---|---|---|---|---|---|---|---|---|---|
| ENTERING VEHICLE (1000/hr) Major | 6.0 | 7.5 | 9.5 | 11.5 | 14.5 | 16.5 | 5.3 | 7.3 | 9.5 | 12.5 | 18.0 | 5.5 | 7.5 | 10,000 VPH |
| ENTERING VEHICLE (1000/hr) Minor | 9.0 | 6.7 | 7.5 | 6.0 | 4.0 | 3.0 | 7.6 | 7.6 | 6.0 | 4.0 | 2.0 | 6.7 | 6.0 | 6,000 VPH |
| HCM LOS (1994) Delay (sec/veh) | 16.7 | 23.8 | 34.8 | 36.1 | 34.4 | 32.6 | 20.2 | 26.1 | 23.8 | 29.8 | 27.2 | 13.5 | 17.6 | 25.9 SEC. |
| LOS Level | C | D | E | E | E | E | D | D | D | D | D | C | C | D (>20,<30) |
| TRAF-SAFE Model Annual Accidents | 4.54 | 5.26 | 5.63 | 5.65 | 5.91 | 6.55 | 3.47 | 4.06 | 4.16 | 4.77 | 7.08 | 3.12 | 3.59 | 4.91 Acc/Yr |
| TRAF-SAFE Model Fatal+Injuries/Yr | 1.22 | 1.43 | 1.54 | 1.57 | 1.69 | 1.90 | 0.90 | 1.08 | 1.12 | 1.33 | 2.08 | 0.79 | 0.92 | 1.35 Fa+Inj/Yr |
| TRAF-SAFE Model ISLOS (Acc/Yr) | F | F | F | F | F | F | E | E | E | F | F | E | E | F (>4.50/Yr) |
| ISLOS (Fa+Inj/Yr) | F | F | F | F | F | F | F | F | F | F | F | F | F | F (.0.75/Yr) |

|— — 2 LANES EACH APPROACH — — — | — — 2 LANES MAJOR + 1 MINOR — | 1 LANE EACH |

ASSUMPTION: MUTCD CASES 1-13 REPRESENT THE RESPECTIVE MAJOR AND MINOR VOLUMES PEAK HOUR/DELAY WARRANT #11 )

: ALL 4-LEG INTERSECTIONS; MAJOR VOLUME IS TOTAL 2-WAY; MONOR VOLUME IS TOTAL 1-WAY; 4TH MIINOR LEG VOLUME IS MAJOR VOLUME

: MAJOR ROADWAY-40 MPH WITH NO BAYS; MINOR ROADWAY-30 MPH, WITH NO BAYS.

: MAJOR ROADWAY-10% LT AND 10% RTTURNING; MINOR ROADWAY-25% LT AND 25% RT TURNING.

: MAX. ANNUAL ACCIDENT LEVEL FOR TWSC (TWO-WAY STOP CONTROL) = 5.0/YR AT ISLOS E/F THRESHOLD

: MAX. ANNUAL INJURY LEVEL FOR ALL TRAFFIC CONTROL TYPES = 0.75 (FATALITIES + INJURIES)/YR (AUTO OCCUPANCY = 2.0/VEHICLE) AT ISLOS E/F THRESHOLD.

: GENEERAL DEFAULTS-P/R TIME = 1.0 SEC; VEH. LEN. = 20 FEET; STOP SIGN SETBACK = 10 FEET; MERGE HEADWAY = 2.0 SEC(MAJOR) & 1.0 SEC(MINOR); 365 DAYS/YR.

FIG. 18

SLIDE OF ACTUAL ANNUAL ACCIDENT HISTORY
FOR 65 FDOT TWSC INTERSECTIONS

SLIDE OF TRAF-SAFE PROGRAM ANNUAL ACCIDENT PREDICTION
FOR 65 FDOT TWSC INTERSECTIONS

TRAFFIC CONTROL CRITERIA
FOR LOW VOLUME INTERSECTIONS

| *Sight Distance* | *Accident History*[a] | *Major Roadway Volume* | |
|---|---|---|---|
| | | *≤ 2000 vpd* | *> 2000 vpd* |
| Adequate | 0 | No control | |
| | ≤ 2 | YIELD | |
| | 3 | STOP[b] | |
| | 4+ | STOP | |
| Not adequate | | | |

SOURCE: W. R. Stockton, R. Q. Brackett, and J. M. Mounce, *Stop, Yield, and No Control at Intersections*, Report No. FWHA/RD-81/084, FWHA, Washington, DC, June 1981, PB 82 117649.

[a] Accidents shown are "accidents per three years."

[b] If minor roadway is greater than 300 vpd, YIELD control is appropriate for intersections with less than four accidents in three years.

FIG. 20

RURAL ROADWAY SAFETY LEVELS OF SERVICE (RSLOS) FOR THE 13 MUTCD INTERSECTIONS OF FIGURE 18 ON A 2.25 MILE ROADWAY

CALIBRATED FOR FDOT. 7

TRAF-SELF LEVEL OF SERVICE/MUTCD EXAMPLES

| | |
|---|---|
| 2.IS THE STUDY URBAN OR RURAL? = | RURAL |
| 3.TOTAL INTERSECTIONS IN STUDY? = | 13 |
| 4.NUMBER OF SIGNALS PER MILE?= | 0.00 |
| 5.URBAN POPULATION . 250,000? = | Y |

ROADWAY SAFETY LEVELS OF SERVICE

| (INJURIES PER 100 ACCIDENTS) | (MVM) ROADWAY |
|---|---|
| LOS A | 0-600 |
| LOS B | 600-750 |
| LOS C | 750-900 |
| LOS D | 900-1100 |
| LOS E | 1100-1300 |
| LOS F | >1300 |

ROADWAY SAFETY LEVELS OF SERVICE

| INTERSECTION OR DRIVEWAY NUMBER | INJURIES/ /100 ACC. |
|---|---|
| 1 | 141.41 |
| 2 | 171.16 |
| 3 | 193.05 |
| 4 | 210.14 |
| 5 | 234.69 |
| 6 | 285.34 |
| 7 | 112.52 |
| 8 | 139.87 |
| 9 | 149.99 |
| 10 | 192.25 |
| 11 | 322.70 |
| 12 | 105.38 |
| 13 | 126.20 |

FIG. 21A

SUGGESTED RURAL ROADWAY SAFETY LEVELS OF SERVICE (10)*

| ROADWAY SAFTY LEVEL OF SERVICE (RSLOS) | AVERAGE TRAVEL SPEED (MPH) | ROADWAY VOLUME/CAPACITY (V/C) RATIO | PERSONS INJURED/ 100 ACCIDENTS PER MVM |
|---|---|---|---|
| A | 48-60 | 0.00-0.62 | 0-600 |
| B | 44-48 | 0.62-0.71 | 600-750 |
| C | 41-44 | 0.71-0.75 | 750-900 |
| D | 37-41 | 0.75-0.80 | 900-1100 |
| E | 35-37 | 0.80-0.85 | 1100-1300 |
| F | 0-35 | 0.85-1.00 | 1300 OR MORE |

* FOR AVERAGE TRAVEL SPEED LESS THAN 60 MPH.

FIG. 22

SUGGESTED URBAN (CLASS 1) ROADWAY SAFETY LEVELS OF SERVICE (10)*

| ROADWAY SAFTY LEVEL OF SERVICE (RSLOS) | APPROXIMATE AVERAGE TRAVEL SPEED (MPH) | ROADWAY VOLUME/CAPACITY (V/C) RATIO ** | PERSONS INJURED/ 100 ACCIDENTS PER MVM |
|---|---|---|---|
| A | 20-35 | 0.00-0.62 | 0-125 |
| B | 18-20 | 0.62-0.71 | 125-145 |
| C | 17-18 | 0.71-0.75 | 145-155 |
| D | 16-17 | 0.75-0.80 | 155-165 |
| E | 15-16 | 0.80-0.85 | 165-175 |
| F | <15 | 0.85-1.00 | 175 OR MORE |

* TYPICAL FREE FLOW SPEEDS LESS THAN 40 MPH
** ASSUMED AS TRANSFERRABLE FROM FIGURE 22.

FIG. 23

SUGGESTED URBAN (CLASS II) ROADWAY SAFETY LEVELS OF SERVICE *

| ROADWAY SAFTY LEVEL OF SERVICE (RSLOS) | AVERAGE TRAVEL SPEED (MPH) | ROADWAY VOLUME/CAPACITY (V/C) RATIO ** | PERSONS INJURED/ 100 ACCIDENTS PER MVM |
|---|---|---|---|
| A | 15-35 | 0.00-0.62 | 0-125 |
| B | 14-15 | 0.62-0.71 | 215-250 |
| C | 13-14 | 0.71-0.75 | 250-265 |
| D | 12-13 | 0.75-0.80 | 265-285 |
| E | 11-12 | 0.80-0.85 | 285-300 |
| F | <11 | 0.85-1.00 | 300 OR MORE |

* TYPICAL FREE FLOW SPEEDS LESS THAN 35 MPH
** ASSUMED AS TRANSFERRABLE FROM FIGURE 22.

FIG. 24

SUGGESTED URBAN (CLASS III) ROADWAY SAFETY LEVELS OF SERVICE *

| ROADWAY SAFTY LEVEL OF SERVICE (RSLOS) | APPROXIMATE AVERAGE TRAVEL SPEED (MPH) | ROADWAY VOLUME/CAPACITY (V/C) RATIO ** | PERSONS INJURED/ 100 ACCIDENTS PER MVM |
|---|---|---|---|
| A | 11-30 | 0.00-0.62 | 0-350 |
| B | 10-11 | 0.62-0.71 | 350-400 |
| C | 9-10 | 0.71-0.75 | 400-430 |
| D | 8-9 | 0.75-0.80 | 430-460 |
| E | 7-8 | 0.80-0.85 | 460-490 |
| F | <7 | 0.85-1.00 | 490 OR MORE |

* TYPICAL FREE FLOW SPEEDS LESS THAN 30 MPH
** ASSUMED AS TRANSFERRABLE FROM FIGURE 22.

FIG. 25

TRAFFIC SAFETY PREDICTION MODEL

CROSS REFERENCE TO RELATED APPLICATIONS

This application is a continuation-in-part of application Ser. No. 08/372,336 filed on Jan. 13, 1995, now abandoned.

I. BACKGROUND OF THE INVENTION

A. Field of the Invention

The present invention relates to the formulation of mathematical annual accidental and severity prediction models for a variety of applications where conflicts are generated as with human conflict, environmental (possibly weather) conflicts and more specifically in this application with vehicle conflicts for highway intersections and roadway segments, and to the statistical format for each of the submodels which estimate annual angle probable conflict opportunities, annual rear-end probable conflict opportunities, annual side-swipe probable conflict opportunities, and annual fixed object (single vehicle) probable conflict opportunities, and their formulation into a further statistical format which summarizes all of the conflict opportunities into an annual quantity of total probable conflict opportunities which are speed weighted, and using a stable mathematical relationship between speed weighted annual total conflict opportunities and annual accidents, both accurately and with relative precision estimates future annual accidents at any typical highway intersection under any typical traffic volumes, any typical combination of horizontal geometry and lane or bay traffic assignments, and any typical traffic control device including "No" control (driveway), "Yield" control, two-way "Stop" control, four-way "Stop" control, or signalized traffic control. Using the annual accident estimate for an individual intersection and prior research of the relationship between speed, and annual accidents and fatal or injury involvement's, an estimate of future annual fatal and injury personal involvement's is also developed which along with annual accident quantity can be compared to prior research of the quantity levels associated with acceptable/unacceptable hazard quantity levels for each type of traffic control, and also compared with a quality level associated with an acceptable/unacceptable hazard level for annual personal injury and fatality severities to determine whether the existing and/or a proposed future intersection is or will become hazardous (or incrementally hazardous) by either an inordinate quantity of annual accident occurrences or an inordinate quality (severity) of annual personal involvements. In addition, by summing the estimated annual personal injury and fatality involvement's over multiple intersections comprising a highway route and based on the prior researched relationship of route Safety Levels of Service (hazard levels), an entire existing or proposed future highway route can be assessed as either hazardous or non-hazardous (or incrementally hazardous) thereby permitting an entire highway route (as well as any involved intersections) to be examined and/or redesigned to provide acceptable hazard levels. Together with proper engineering judgment, both future highway intersections and routes may be designed interactively by balancing traffic volumes, geometries, and traffic control types against hazard levels to maximize future intersection and highway route safety performance.

Application of the concepts and statistical formulations of this invention are not intended to be restricted to only highway or transportation purposes but may be applicable to other fields of probable event and conflict relationships.

B. Description of the Prior Art

Historically in the transportation field, the only mathematical tools to predict annual accidents have been exposure (rate) based models such as accidents per million entering vehicles for intersections and annual accidents per million vehicle miles of travel for open roadway routes. One attempt to quantify the safety relationship of highway routes using the latter model was published by Jason Yu in October 1972 entitled *Establishing Relationship of Level of Service and Highway Safety.*

But neither of these methods are sensitive to the myriad of complexities which affect accident occurrence including the quantity of traffic volumes and their peaking characteristics throughout the day, week and year; the character of the horizontal geometry including the presence of left and/or right turn bays, turning radii, acceleration/deceleration lanes, and median separation from opposing traffic; or the type of traffic controls including no control, yield, two-way stop, all-way stop, or signalized control including the intricate nuances of traffic signal phasing and timings, or the combined effects of roadway and intersection capacity which promote or reduce accidents. In Access Management (designing the spacing of access openings as affected by the character of each access), the problem of reasonably predicting accident expectancies becomes even more complex than the open roadway because of the differences from one access opening to the next given their relative proximity, where the resultant accident expectancies varies depending on the traffic volumes at each independently operating access opening.

Relative precision in the modeling of transportation events has been used many times as an alternative prediction methodology. Probably one of the best known such models is the relative precision model developed by Webster to predict delay at signalized intersections. In Webster's original model, two distinct types of delay were mathematically hypothesized including 1) Uniform delay and 2) Incremental or random delay. Today, delay models very similar to Webster's are regarded as the backbone of the Signalized Intersection Chapter of the Highway Capacity Manual (HCM) of the Transportation Research Board. And from these mathematical delay models, Delay-based Levels of Service (LOS) for intersection design and control are used as standard features of both transportation planning and design professions, and for the development of Growth Management in urban areas such as with Florida's Growth Management Laws. Yet the basic premise for the management of growth and for the design and planning of signalized intersections still rests upon mathematical models which are only relative, and not exact. After all, it is highly unlikely that any one intersection would produce delay results which replicate exactly the delay which the Highway Capacity Manual or Webster's models predict. From this, it may be seen that the prediction of many values in transportation, whether delay, volumes, or accidents does not rest upon the need for absolute accuracy (because absolute values will always be masked by human, vehicle or environmental factors), but upon the need for realistic accuracy with relative and stable precision.

Several other automobile accident prediction models have been developed in the past, but each of these have focused on the prediction of damage from an accident or with warning a driver of an impending accident location ahead based upon existing accident history with no prediction of future accident history.

U.S. Pat. No. 5,270,708 issued to Kamishima on Dec. 14, 1993, discloses one such model including a position and orientation sensor which forecasts the possibility of occurrence of an accident based on pre-existing accident histories and reiterates throughout that "past traffic accident data" is stored, extracted and used to discriminate the potential for accidents ahead based on vehicle proximity to an individual accident location, but this model has no capability for forecasting future accidents based on volume, geometric or traffic control changes to the road ahead. U.S. Pat. No. 5,251,161 issued to Gioutsos et al. on Oct. 5, 1993 discloses a method of modeling a vehicle crash wave form to test a crash detection system. U.S.S.R. Patent Document No. 658,575, published on Apr. 30, 1979 to Spichek et al., shows a transport vehicle electronic impact modeling unit for modeling unsurmountable and surmountable obstacles.

U.S. Pat. No. 4,179,739, issued Dec. 18, 1979 to Virnot, discloses a system providing a memory controlled railroad traffic management process. This method regulates the traffic over a network of itineraries travelled by various vehicles such as railroad trains. In addition, several articles have been published drawn to systems and concepts for controlling the flow of traffic, particularly, to reduce the occurrence of traffic jams and/or rear-end collisions. For example, Dickinson et al. published an article in May 1990 entitled *An Evaluation of Microwave vehicle Detection at Traffic Signal Controlled Intersections* that discusses monitoring traffic flow however, does not provide any traffic safety models or predictions. Favilla et al. published an article in March 1993 entitled *Fuzzy Traffic Control: Adaptive Strategies* that discusses the implementation of a logic control system, where the logic is defined by the individual parameters, using the instantaneous traffic flow volumes for generating the traffic light control signals at each intersection in which the system is installed. Harris published an article in August 1994 entitled *The Development and Deployment of IVHS in North America*, which discuses the historical development of the IVHS in North America, and the prospectus as the turn of the century approaches. Bielefeldt et al. published an article in April 1994 entitled *MOTION - A New On-Line Traffic Signal Network Control System*, discussing a specific on-line monitor and traffic flow control system. Hoyer et al. published an article in June 1994 entitled *Fuzzy Control of Traffic Lights*, that generally describes the implementation of fuzzy logic utilized in a traffic control system. Lee et al. published an article in August 1994 entitled *Development and Assessment of a Traffic Adaptive Control System in Korea*, describes the utilization of a coordinated traffic control system over a large spatial area versus individual uncoordinated intersections. Petzold et al. published an article in 1990 entitled *Potential for Geographic Information Systems in Transportation Planning and Highway Infrastructure Management*, discusses a specific apparatus using spatial analysis for traffic flow control at intersections. Saito et al. published an article in May 1990 entitled *Dilemma and Option Zones, the Problem of Countermeasures*, implementing a traffic control system utilizing the timing interval of the red/yellow/green lights for reducing rear-end collisions. Kotz et al. published in a textbook in 1983 entitled *Educated Guessing*, a mathematical algorithm for predicting the probability of specific group of variables.

None of the above inventions and patents, taken either singly or in combination, is seen to describe the instant invention as claimed. Thus there exists no Prior Art with respect to the formulation of mathematical models which interactively predict annual accidents, severities and hazard levels at a highway intersection simultaneously for present or estimated future traffic volume levels, for present or estimated future horizontal geometric conditions, and for present and estimated future traffic control types, nor is there any Prior Art with respect to the application of the annual future severity estimates to examine the existing or estimated future hazard levels associated with either an individual intersection or a highway route composed of a number and variety of alternate intersection types.

II. SUMMARY OF THE INVENTION

Numerous studies have reported on the impacts, effects, and correlation of conflicts to accidents at specific intersections and roadways with most finding weak correlation to accident occurrence. This is not unexpected in the modeling of conflicts because the recordation of a conflict occurrence is generally developed from the observation of an on-road brake light application where the driver's brake light pedal pressure is unique among drivers and influenced and confounded by human, vehicle and environmental factors and effects. Because of this, actual on-road conflicts are often inconclusive as accident surrogates, and it becomes necessary to develop a more precise and stable formulation of conflict occurrence.

Statistical formulations of events in highway engineering over the last several decades has become an area of significant involvement because of the size of data bases available and the ability of statistics to be placed in microcomputer formats for use by planning and design personnel. In mathematical accident modeling using "per million entering vehicles" or "per million vehicle miles of travel", statistics have become an essential part of the process in determining whether improvements have had a significant effect on prior accident occurrence. This acceptance of statistical concepts can also permit planning and design personnel to understand that actual (on-road) conflicts can be replaced by statistical (off-road) conflicts. For purposes of this modeling, the formulation of statistical (off-road) conflicts are referred to as Statistically Probable Conflict Opportunities (SPCO's) or more simply Probable Conflict Opportunities (PCO's).

The object of the present invention is to provide for traffic engineering and transportation planning professionals a mathematical model to examine the existing hazard levels of highway intersections and routes, and for designing safety into intersection and highway route project design before construction by accurately estimating the annual accident and severity effects of alternative intersection designs and highway route intersection spacing strategies to provide for optimal safety and minimize the development of hazardous safety levels within the design life of the highway intersection or route project.

To achieve the above-mentioned object, the mathematical models and their formulations use a finite element analysis approach and break the accident models, each intersection, and each highway route into discrete elements comprised of: (a) four similarly formatted accident models (angle, rear-end, side-swipe, and fixed object) each of which use discrete elements such as lanes, turnbays, traffic control type, and traffic flow rates (based on normalizing assumptions regarding drivers, vehicles and environments) to create a new and unique statistical likelihood that two separate vehicles will be on intersecting and conflicting paths of advancing and opposing vehicles but only for a finite and discrete period of time (using prior research of the conflict exposure relationship as a function of specific intersection and other characteristics) which thereby creates the opportunity for conflict and defines a Statistically Probable Conflict Opportunity, (b) where for each of the above Statistically Probable Conflict Opportunity models, the conflict is defined as the statistical union of the probability of two assumed mutually exclusive events including 1) the probability of vehicle arrival for a particular movement, and 2) the probability of vehicle opposition to the arrival with both probabilities using the Poisson Distribution or similar statistical distribution but only during the period of time the arriving vehicle is exposed to conflict, which is a significant difference of the SPCO mathematical formulations from any prior accident and conflict modeling relationship, (c) a mathematical format which uses speed-based weightings calibrated to actual accidents to sum each of the above four probable conflict opportunity mathematical model estimates into a total summed annual conflict opportunity estimate and from this summation to determine annual accidents using a stable linear mathematical relationship between total summed annual probable conflict opportunities (regardless of type) and total annual accidents at an intersection as a function of traffic control type {which is referred to as the Access Management Accident (AMA) Model}, (d) a surrogate exposurebased accident mathematical model for use with Fixed Object (single vehicle) annual accidents to simplify Fixed Object annual accident estimation in lieu of measuring the location and type of each physical feature adjacent to each intersection approach or roadway, (e) mathematical models created from prior research to estimate annual fatal and personal injury involvement's given the speed of operation and annual accident involvements at an intersection, (f) mathematical comparisons of annual accident quantity with prior research of quantity-based hazard definitions, (g) mathematical comparisons of annual personal injury and fatality (quality/severity) involvement's with a user defined severity-based hazard definition which with the above hazard quantity indicator can be used to examine and/or design hazard levels at individual intersections , and (h) summing estimated future fatal and injury involvement's from multiple intersections to form a composite severity measure for a highway route, which with normalizing national accident statistics for each state can be used with prior research to provide nationally comparable mathematical comparisons of highway route and even Statewide hazard levels for existing and/or projected future conditions as affected by changes traffic volumes, geometries and/or traffic control devices.

"Safe or Unsafe" and hazard levels associated with these are perceptions viewed differently by each highway driver based on psychological and physiological conditioning at a particular point in time and under conditions which are constantly changing. Given that this perception is variable to the driver and influenced by the vehicle and the environment, the absolute threshold of safe/unsafe or hazardous/not-hazardous can never be set with precision for an individual driver. However, "Apparent Thresholds of Safety or Hazard" may be used as indicators of actual levels where the apparent threshold appears as either a widely accepted standard or where logic suggests a reasonable threshold. In a traditional definition, "Hazard" is composed of two mutually exclusive elements either of which may independently cross the threshold from "safe to unsafe". The first of these elements is "danger" or the exposure to risk which is a quantity-base element, and the second is "harm" which is a quality-based physical or psychological injury or a severity characterization of danger without respect to quantity. Thus an "Generally Hazardous or Unsafe" condition may be defined by either:

1. An overt number of unacceptable events (accidents) per unit time—One of the most long-standing and accepted apparent hazard thresholds is that provided by the "Accident Experience Warrant" (#6) of the Manual of Uniform Traffic Control Devices (MUTCD-USDOT) which provides that where annual accidents correctable by the presence of a traffic signal exceed 5 per year, a "Stop" controlled intersection may be converted to signalized control. In a similar manner, prior research of traffic control types has indicated that where "Yield" traffic control exists annual accidents should not exceed 0.66 accidents per year, and where "No" traffic control (driveway) exists annual accidents should not exceed 0.33 accidents per year. Threshold hazard quantity indicators do not exist for "All-Way Stop" control or for signalized intersection control where the quality or severity of hazard generally define acceptable or hazardous operating conditions, or
2. One event where the quality of the event (accident) is so severe as to be unacceptable—The outcome of any one accident may result in a combination of property damage, personal injury and/or fatality to one or more occupants where neither property damage nor personal injury may provide an adequate characterization of accident quality. However, where an individual fatality occurs, it may be said with certainty that had the person known the trip would result in death, there is little doubt the trip would have occurred, unless the intent was fatal which cannot by definition conform to the assumption of a normal driver. Barring intentional death, a fatality is one outcome of an accident which is unacceptable under all circumstances, and from this a severity threshold criterion can be established which provides that "No driver or passenger should die as a result of an auto accident in their lifetime". Assuming a conservative lifetime of 100 driving years (approximately 115 years of age) and only one occupant per vehicle (a conservative approach to safety threshold definition), using this definition no intersection should produce an annual fatality estimate which exceeds 0.01 per year or 1 fatality in 100 years of intersection operation. Since from national accident statistics, the average auto occupancy in injury accidents is approximately 2.0 and given the fatality:injury ratio in an injury accident is approximately 1:37, and that the difference between a personal injury and a fatality may be age, heath or more simply "bad luck" dependent phenomena, a more conservative approach to the definition of a safe/unsafe severity threshold is to include not only estimated fatalities but also personal injuries in the threshold definition such that a reasonable threshold for accident Severity may be where estimated annual personal injuries and fatalities exceed 0.75 per year (0.01*2*(37+1)). However, the selection of life duration, auto occupants and fatality:injury ratio are user defined phenomena which will affect the severity threshold definition and subsequent incremental hazard Levels of Service.

Having defined an adequate "Safe/Unsafe" threshold for an individual intersection above (composed of both quantity and quality-based phenomena) and assuming adequate model validation to local environmental areas, driving populations, and vehicle types, the severity estimate of individual intersections may be summed over a pre-defined (existing or proposed) distance which contains all of the intersections and compared to prior research of Route Safety Hazard Levels (Jason Yu, October, 1972) to determine whether a particular route over a specified distance contains an inordinate quantity of severities as adjusted by reference to national accident and other statistics to account for urban/rural, interstate, and environmental factors which permit normalization of the variety of factors affecting hazard level thresholds.

Using the above thresholds for safe/unsafe, hazardous/non-hazardous intersection and highway route safety performance, both Intersection Safety Levels of Service (ISLOS) and Route Safety Levels of Service (RSLOS) may be defined with both numerical and/or alphabetic assignments from A–F representing each of the various safety/hazard levels from excellent and safe (A) to unacceptable and unsafe (F) in a manner similar to the Levels of Service identified by the Highway Capacity Manual of the Transportation Research Board.

Accordingly, it is a principal objective of the invention to provide a prediction model for forecasting the expected number of accidents at an existing or proposed intersection or series of intersections.

It is another objective of the invention to provide a prediction model for forecasting the relative impact of a proposed change to an intersection on the number of accidents or severities at an existing or proposed intersection or series of intersections.

It is a further an objective of the invention to provide a prediction model for forecasting the effects on traffic and accident/severity levels in an area by adding, replacing, or removing intersections or intersection features to a roadway.

Still another objective of the invention is to provide a prediction model which rates intersections and highway routes in terms of accidents, severities and hazard levels which can be used to compare safety levels between disparate geographic areas.

And it is an objective of the invention to provide improved elements and arrangements thereof in an apparatus for the purposes described which is inexpensive, dependable, stable and fully effective in accomplishing its intended purposes.

These and other objects of the present invention will become readily apparent upon further review of the following specifications and drawings.

III. BRIEF DESCRIPTION OF THE DRAWINGS

FIGS. 4–15 are a flow diagram for calculating the expected number of accidents, injuries and fatalities at an intersection, and for calculating the Safety Levels of Service for the intersection and roadway including suggested intersection Safety Levels of Service comprised of both a Severity criterion which applies to all traffic control types and a Quantity criterion for uncontrolled driveways, "Yield" control and Two-way "Stop" controlled intersections.

Figure 16:
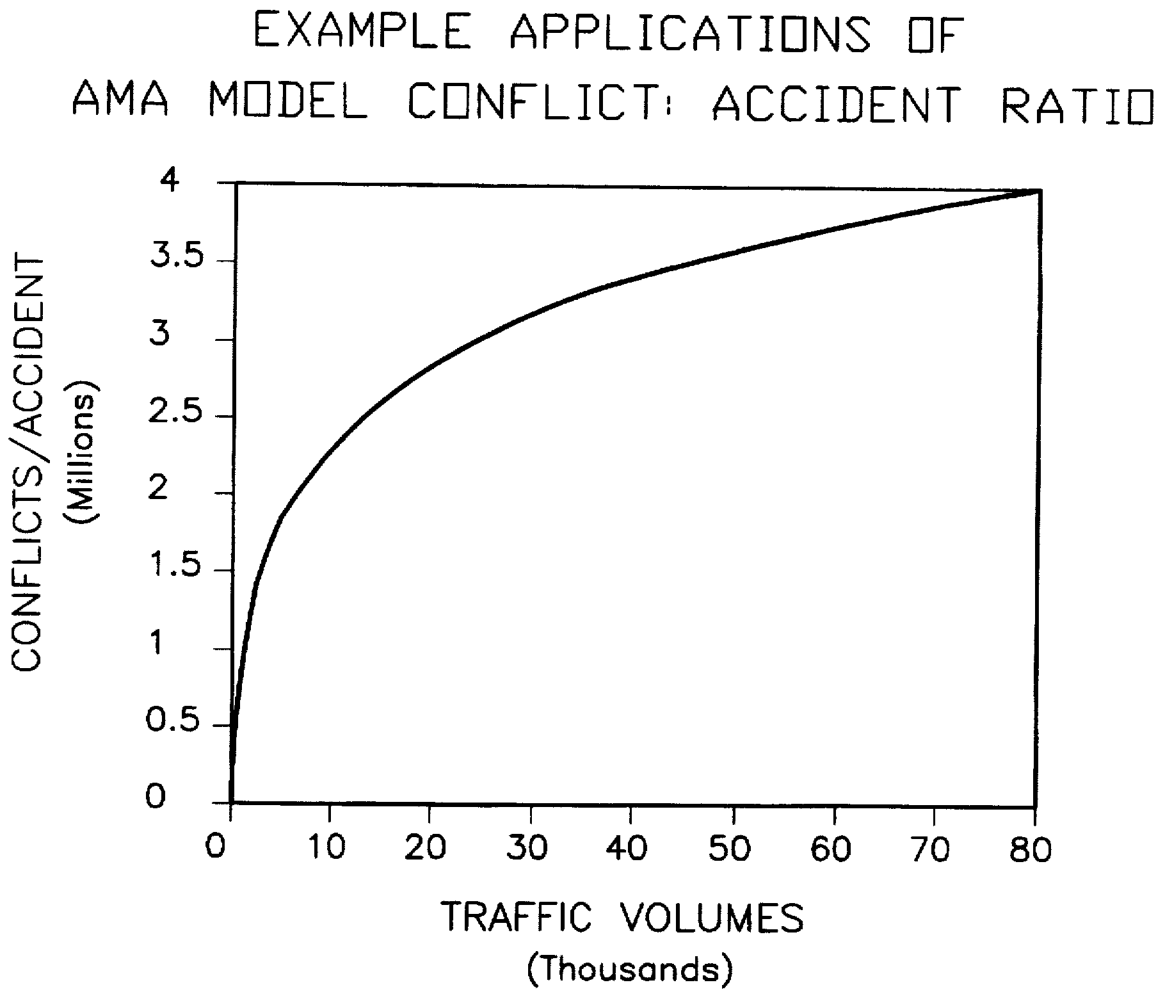

FIG. 16 is a graph of the relationship between the annual statistically probable conflict opportunities per annual accidents over total entering volumes for one traffic control type indicating the typical marginally decreasing relationship between conflict opportunities, accidents and increasing volume levels.

Figure 17A:
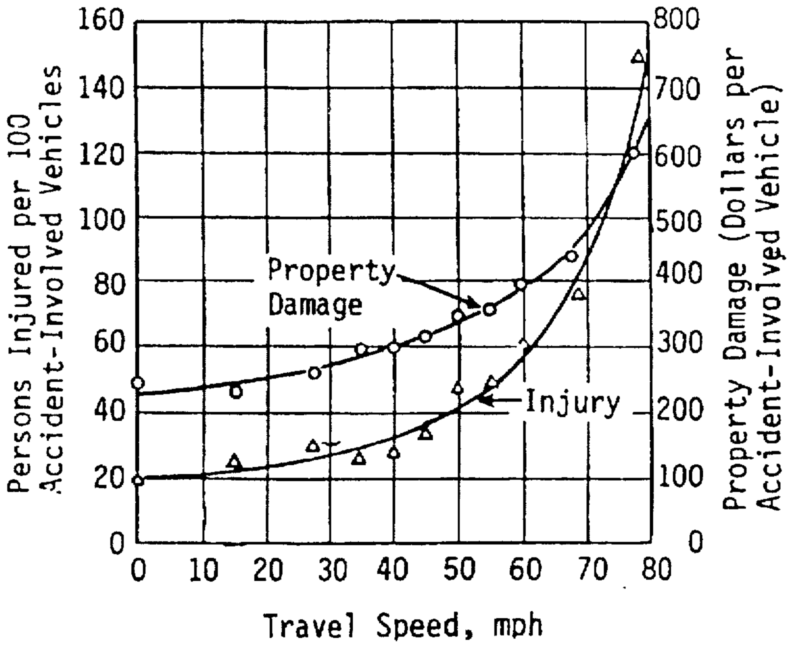
Figure 17B:
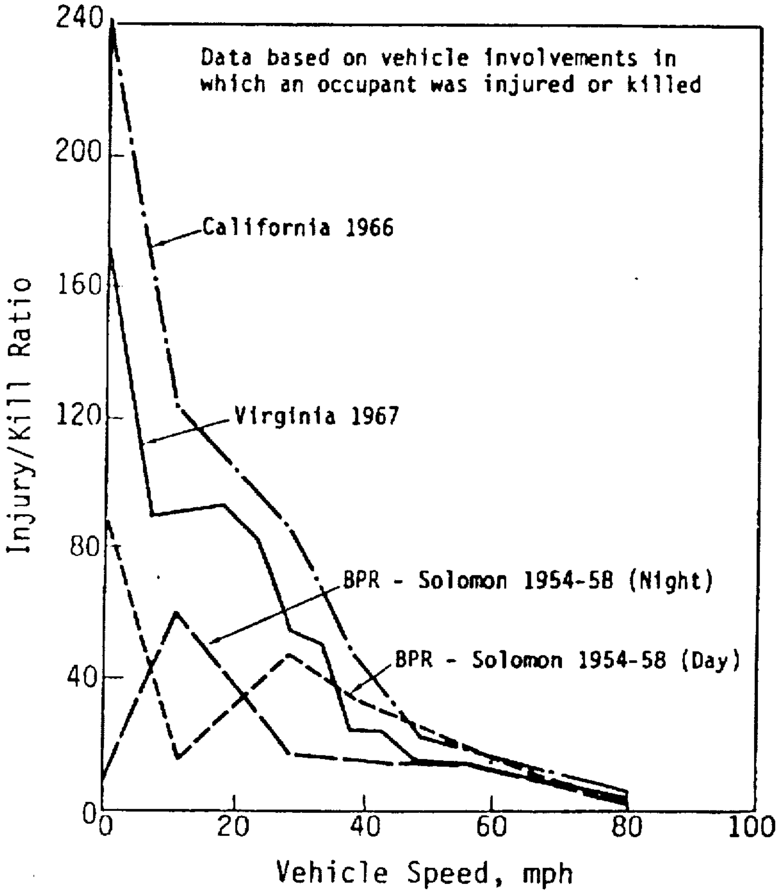

FIGS. 17*a* and 17*b* are Figures from prior research of the relationship of accidents to injuries as a function speed and a relationship of injuries to fatalities as a function of speed which are used to estimate annual injuries and fatalities given annual accident occurrence.

FIG. 18 is a table of 13 case examples from the Manual of Uniform Traffic Control Devices (MUTCD) for comparing the output of the TRAF-SAFE Program to the MUTCD and to the Highway Capacity Manual.

Figure 19A:
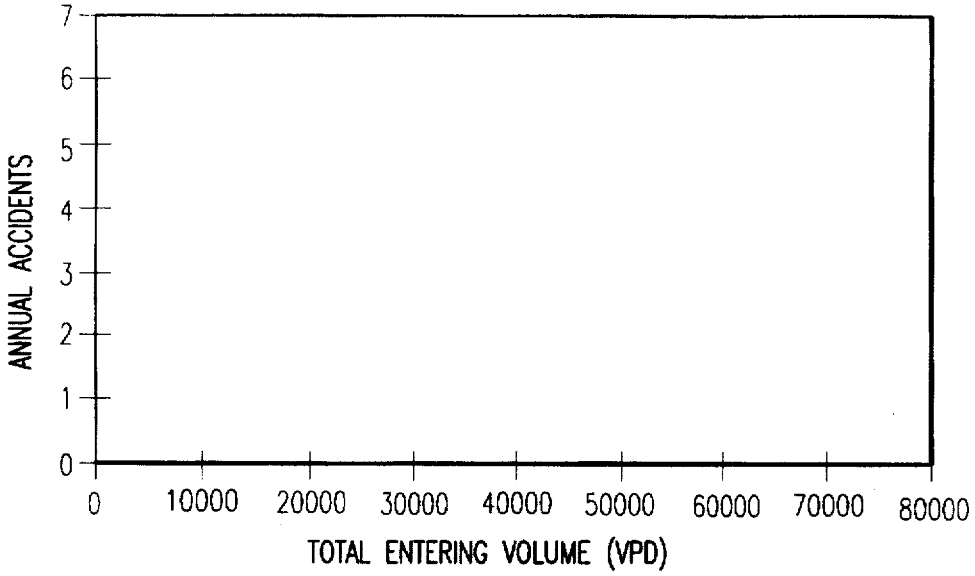
Figure 19B:
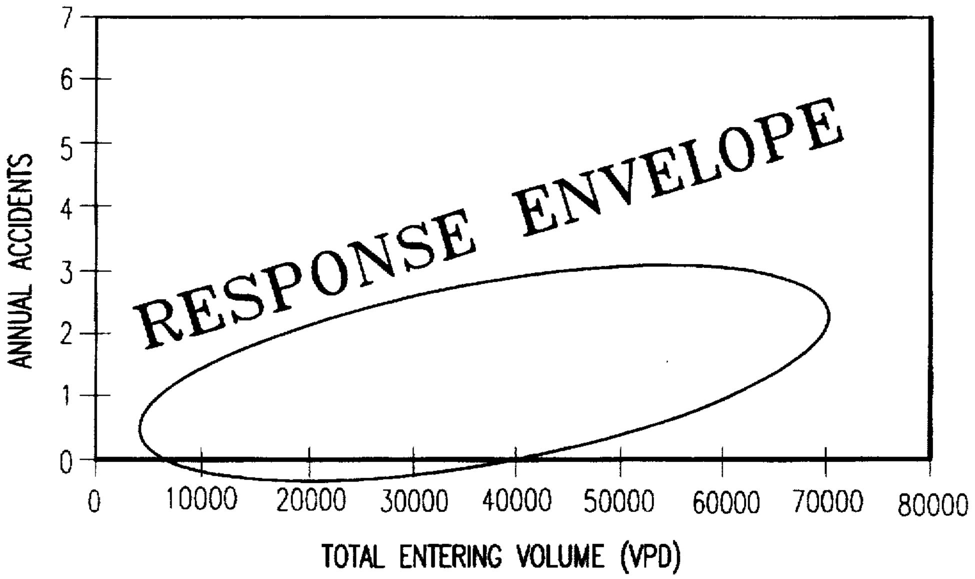

FIGS. 19*a* and 19*b* are slides from a presentation to the Transportation Research Board's 2nd National Access Management Conference in August 1996 of a study sponsored by the Florida Department of Transportation indicating a) original accident data collected from each of 65 sites as a function of total entering volumes, and b) the results from the TRAF-SAFE Program application to the same sites indicating the superior performance of the TRAF-SAFE Program and the SPCO models by eliminating outliners and providing an acceptable response with no prior historical accident knowledge, and in concluding, in comparison to typical statistical analysis, that the TRAF-SAFE Program is "superior to statistics itself in providing an accurate annual accident estimate".

FIG. 20 is an example of the prior research of threshold annual accident quantity criterion which are used to establish Hazard Quantity threshold levels (Intersection Safety Level of Service threshold E/F) for selected traffic control type intersections.

Figure 21B:
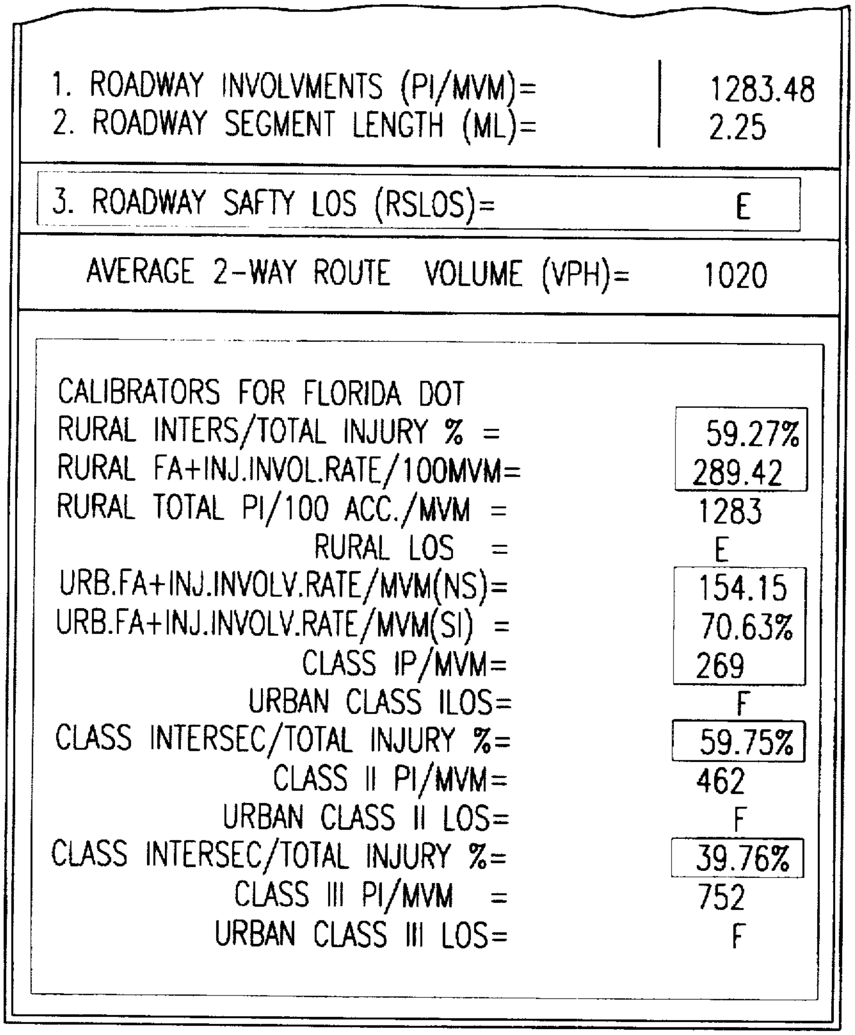

FIGS. 21A–21B is an example of the partial printout or display resulting from calculations according to the present invention.

FIGS. 22–25 are tables of suggested Rural and urban roadway Safety Levels of Service for use with the present invention for different functional classes of roadways.

Similar reference characters denote corresponding features consistently throughout the attached drawings. Please note also for simplicity of determining the Figure of the flow chart in which a reference numeral occurs can be calculated by dividing the reference numeral by 100, unless otherwise noted by reference to a specific figure.

IV. DETAILED DESCRIPTION OF THE PREFERRED EMBODIMENT

The following abbreviations are used throughout the specification:

AADT—Annual Average Daily Traffic
ADT—Average Daily Traffic
AASHTO—American Association of State Highway and Transportation Officials
AMA—Access Management Accident Model (the mathematical form of the present invention comprising the conversion of summed SPCO models into annual accidents)
FHWA—Federal Highway Administration
HCM—Highway Capacity Manual
ISLOS—Intersection Safety Level of Service
LOS—Level of Service
MEV—Million Entering Vehicles
MPO—Metropolitan Planning Organization
MUTCD—Manual of Uniform Traffic Control Devices
MVM—Million Vehicle Miles
RSLOS—Roadway Safety Level of Service
SLOS—Safety Level of Service
SMP—Safety Management Program
SPCO—Statistically Probable Conflict Opportunity
TRAF-SAFE—The Traffic Safety Computer Program (the combined software program which includes the SPCO models, the AMA model, the Hazard Criterion, ISLOS and RSLOS models, and the Safe Access Spacing model)
V/C—Volume/Capacity Ratio
Veh—Vehicle
VPD—Vehicles per day
VPH—Vehicles per hour A. Interrelation of Accidents and Conflicts The present invention is a device for determining the accident and safety level of an intersection or series of intersections (a "roadway") based on intersection and roadway features. The model uses a statistical intersection accident estimation concept which rests in part upon a fundamental premise accepted by the highway design profession that there is a logical relationship between accidents and conflicts, such that as conflicts increase—accidents also increase. And it makes defendable sense that if conflicts can be reduced or eliminated at an intersection, accidents will be reduced or minimized. Conversely, where conflict generation increases, accidents can also be expected to increase. But, unlike a straight line relationship between conflicts and accidents predicted by the American Association of State Highway Officials (AASHTO), there should exist a marginally decreasing limit to the conflict/accident relationship where capacity is reached as shown in FIG. 16. A diminishing number of accidents per conflict should occur at higher speeds. Otherwise, like exposure or rate-based models predictions, more volume will generate more accidents which is untrue at capacity or in congested conditions. One would expect an increase in the severity of an accident at higher speeds, and similarly, where the volume is below capacity the number of accidents in higher speed traffic will be reduced, although severities resulting from each accident may be increased.

If a precise relationship can be developed between actual conflict occurrence (or the probable opportunity for conflict occurrence) and accident occurrence, then the accident expectation can be defined with relative precision. Other variables, including intersection geometry such as bays, medians, radius, and lane width; traffic control types and signalization parameters; and even vehicle types and characteristics and their individual effects toward conflict development can be examined in a relative context such that changes to any one of the variables will generate or reduce conflicts and thereby generate or reduce accident expectancies. The problem has been to develop a fundamental relationship between accidents and conflicts which replicates expectancies, including:

1. As the volume increases at an intersection, the total accidents marginally increase as capacity is marginally reached or fully reached.
2. A four-leg intersection has more accidents than a three-leg.
3. The presence of protected left and right bays reduces accidents.
4. Conversion from stop to signalized control increases rear-end accidents.
5. A larger right radius for vehicles turning right reduces rear-end accidents because divergent speeds are similar.
6. The use of an all-red traffic signal indication reduces accidents.
7. As volume increases, intersections become safer since speeds are reduced.
8. Rear-end accidents increase as volumes increase.
9. Sideswipe accident increase as volume and/or speed increase.
10. Severities increase as speed increases.

The particular expectancy which may be correct for any given location is subject to wide interpretation, but for the purpose of safety model development, such expectancies must be assumed to exist. In addition, the following three assumptions are also essential to the development of a safety management model:

1. All vehicles are normalized as typical vehicles used in AASHTO driveway, intersection and/or roadway planning designs and conform to typical vehicle physical and performance characteristics such that the intersections or driveways where the model is used have normal amounts of vehicle induced accidents (e.g. no excessive number or character of vehicle failures such as numerous "bald tires" or "vehicle fires").
2. All drivers and passengers are normalized as typical drivers and passengers used in AASHTO driveway, intersection, and/or roadway planning designs such that the physical, mental, and emotional characteristics required to safely and efficiently accomplish the basic driving tasks of Control, Guidance, and Navigation are performed, and locations where the model is used have normal amounts of human induced accidents (e.g. no excessive human failures such as alcohol or drug abuse such as in low resource areas, or age impairments which may affect sign reading ability as in areas of Florida either of which may produce non-normal accident responses).
3. The environment is normalized as the typical roadway and environment such as those used in AASHTO driveway, intersection and planning designs such that the driveways, intersections and/or roadways where the model is used have normal amounts of environmentally induced accidents (e.g. no unusual weather conditions such as consistently icy roads in Florida, excessive fog in Nevada, etc. which produce non-normal accident responses).
4. Other assumptions pertinent to each particular driveway, intersection, and traffic control type and/or roadway (e.g. for two-way stop control, driver perception/reaction time, vehicle length, stop sign setback, saturation flows, etc.).

To assure conformance to these assumptions and to examine the expectancies at individual intersections, it is necessary to either validate the model to individual intersections or to validate the model statistically to areas such as Cities, Counties or State Highway Districts where the above assumptions are expected to remain relatively stable at the local level. For instance, since the Traffic Safety Prediction Computer Program (TRAF-SAFE) was calibrated using national data sources, it may respond better in locations such as the Midwest where environmental conditions include both icy and dry weather accidents as opposed to southern Florida where no icy accidents occur. In southern Florida, the TRAF-SAFE program may overestimate annual accident occurrence simply because icy accidents are expected by the model, yet these type of accidents do not occur in southern Florida. Conversely in northern Alaska, the TRAF-SAFE program may underestimate accident occurrence simply because icy accidents may occur more frequently locally than a model developed from a national database may suggest. And as an alternative to both of these scenarios, human conditioning to the local weather in each local area (such as experienced snow driving capability in Canada) may counteract the local accident expectancies, such that the national database remains acceptably accurate over all environmental conditions.

However, because of the potential for local violation of the above assumptions, the TRAF-SAFE Program must be validated to local conditions using either area or individual intersection validations. This local validation is an important part of the Traffic Safety and Access Management accident modeling process.

In the formulation of the conflict/accident relationships for the TRAF-SAFE program, because existing accident databases generally segregate accident occurrence into four major categories which include angle, sideswipe, rear-end, and fixed object or single vehicle accidents, only these four accident types are used in the TRAF-SAFE program. Thus the final significant assumptions used in the TRAF-SAFE program are the additivity of each of the following independent models to produce the total annual number of expected conflict opportunities, where the relationship between accidents and conflicts is presented by the relationship in FIG. 16 as:

Accidents/year=f{Conflicts{(Angle)+(Rear-end)+(Sideswipe)+(Fixed Object)}}; and the assumed stability of the relationship between speed, annual accidents to injury occurrence and injury occurrence to fatality occurrence as developed by prior research and presented in FIG. 17 is:

Severities/year=f{Accidents/yr, speed, accident:injury ratio and injury:fatality ratios}.

B. THE CONCEPT OF STATISTICALLY PROBABLE CONFLICT OPPORTUNITY

The TRAF-SAFE program rests upon the development and application of four Statistically Probable Conflict Opportunity (SPCO) Accident Models (angle, rear-end, sideswipe, and fixed object) where the production of a conflict follows a similar format and all are summed to provide annual SPCO's regardless of type. With this approach, there is no attempt to predict the actual type of accident which may occur as a result of conflicts, but only to produce an estimate of annual accidents. Thus no relationship is expected between types of conflict opportunities and types of actual accident outcomes simply because accidents often are stimulated by one conflict type only to result in a completely different accident type, which to one driver appeared less harmful than the original conflict.

In the SPCO model development, a conflict is defined as a statistical union of the probability of two assumed mutually exclusive events including:

1. The probability of vehicle arrival for a particular movement, and
2. The probability of vehicle opposition to the arrival movement BUT ONLY DURING THE TIME THE ARRIVING VEHICLE IS EXPOSED TO A CONFLICT. This particular formulation of competing elements within a probability model is a significant difference of the SPCO formulations from any prior accident and conflict modeling relationship, and is expected to remain valid in a number of other conflict and accident or hazard estimation events including but not limited to predicting the hazards associated with the conflict between an army column of one type in conflict with a second army column of another type but only during the time one type is exposed to the other, or even in predicting the hazards associated with weather as an outcome of the conflict between differing weather fronts where one front is exposed to conflict with the other weather front but only for a finite time period.

Using this concept for application to vehicles and accidents and the above assumptions, SPCO's are formulated for each of the angle, rear-end, sideswipe and fixed object conflicts as follows:

SPCO Conflict Opportunity=P(Conflict Veh. Arrival)*P(Veh. Opposition to the Arrival)

where:

P(Conflict Vehicle Arrival)=the probability that any vehicle arriving on any approach in any lane will desire to make (or arrive for) a particular conflict, and P(Vehicle Opposition to the Arrival)=the probable arrival of one opposing vehicle (from angle, rear-end, side or fixed roadside) such that the opposing vehicle may not permit the arriving vehicle to complete the intended maneuver. Generally, the arriving vehicle can complete its intended maneuver if an opposing vehicle does not arrive in the time it takes to complete the intended (arrival) maneuver.

Descriptions of an SPCO Conflict Opportunity for the four conflict models include:

1. In an angle conflict, the probability that a vehicle on the major street will come into contact (Angle Conflict Arrival) with a vehicle from a turning movement (opposition), such as a through movement has no probable conflict with through vehicles in the opposing direction, while it will have probable conflict opportunity with lefts from the opposing direction.
2. For a rear-end conflict, the probability of a vehicle stopping (Stop Conflict arrival) on any approach such as vehicles on a minor "Stop" controlled approach must stop while major street vehicles will not, and during the duration of the stop condition, vehicles on the minor street are subject to a conflict opportunity from a vehicle advancing from the rear (opposing).
3. For a sideswipe conflict, the probability of a vehicle making a lane change (Sideswipe or Lane Shift Conflict Arrival) in advance of an intersection such as turning vehicles not in the turning lane must shift lanes (or through vehicles in shared lanes may shift due to saturation of the shared lane), and where the lane to be entered is occupied by another vehicle, a sideswipe conflict opportunity exists.
4. For a fixed object or single vehicle conflict, the probability of a vehicle leaving (Fixed Conflict Arrival) the right side or left side traveled lane to come into conflict with a fixed object (which may also be a moveable pedestrian type object) on the roadside will depend on the proximity and frequency of repetition of the fixed object (opposition) which will determine the opportunities for a fixed object or single vehicle probable conflict. An alternative procedure for calculating the fixed object conflict model is to incorporate the FHWA "Roadside Accident Model" which may also generate probable exposures and accidents. However, since fixed objects often constitute a small percentage of total accidents, the TRAF-SAFE Program preferably includes rate based fixed object models (which do not require the collection of roadside data) which is a far simpler and less costly procedure.

Each of the above probabilities (P) are calculated under the assumptions that the arriving flows are random and at low volumes. Under these assumption, the Poisson Distribution, which is also the most commonly accepted distribution for accident estimation, is acceptable. It should be noted that the Poisson distribution may not be as appropriate for heavy traffic conditions since vehicle lengths and thus successive headways are not independent as required by the assumption of random arrivals. One skilled in the art would recognize that the traffic accident prediction model could be altered to include alternative statistical distributions which may more accurately reflect headway and vehicle length effects at higher volume levels. The exposure times of the arrival vehicles are based upon the well known Highway Capacity Manual (1985-HCM) critical gap times as contained for unsignalized intersections, or upon safe stopping distances for through vehicles exposed to sidestreet conflicts (such as an entering sidestreet vehicle stalling in the initial acceleration). In this manner, angle, rear-end, sideswipe, and fixed object conflicts for each movement may be calculated and summed as Annual Statistically Probable Conflict Opportunities (SPCO's).

C. SPCO CALCULATION—OVERVIEW

Figure 13:
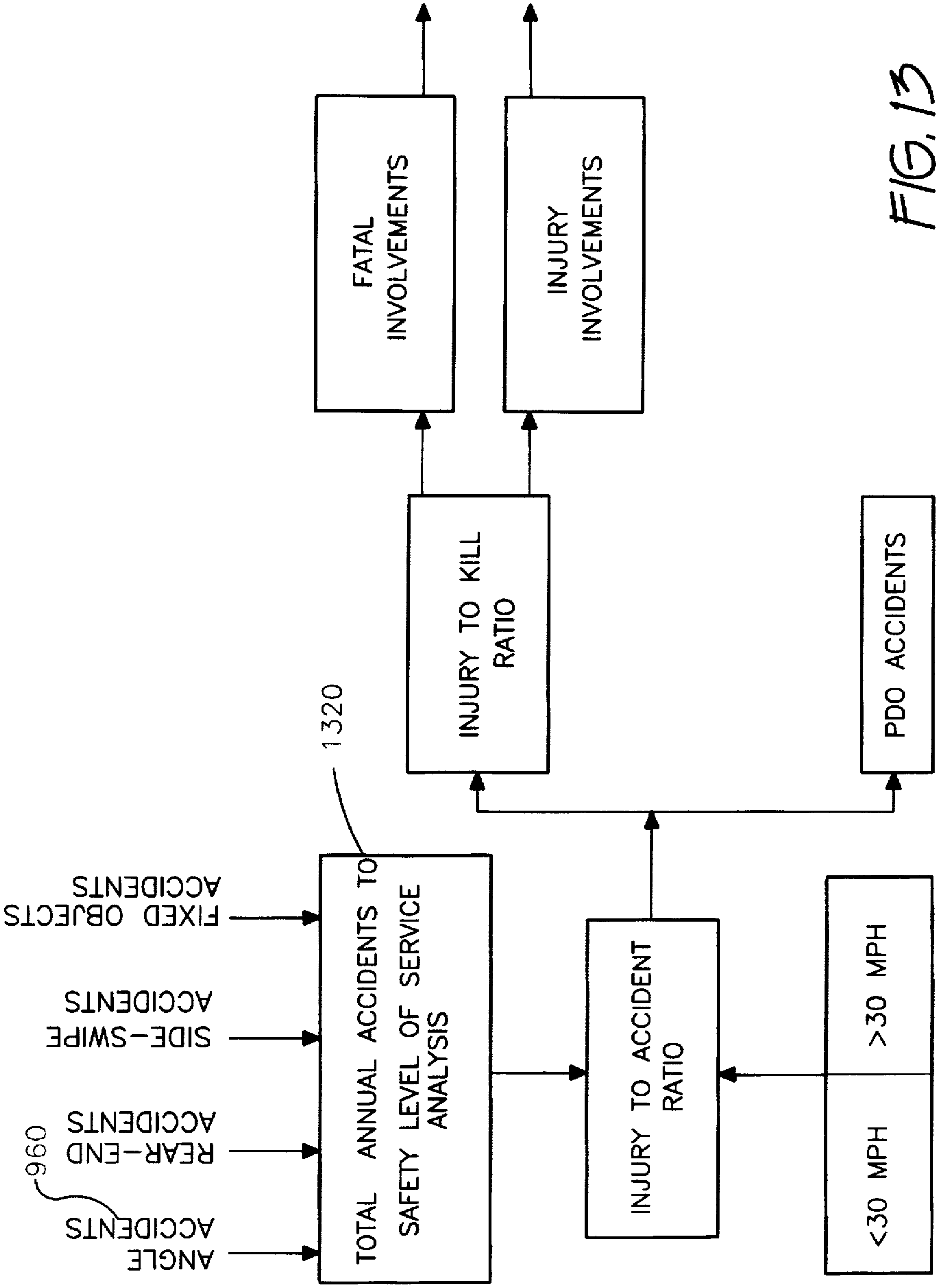
Figure 14:
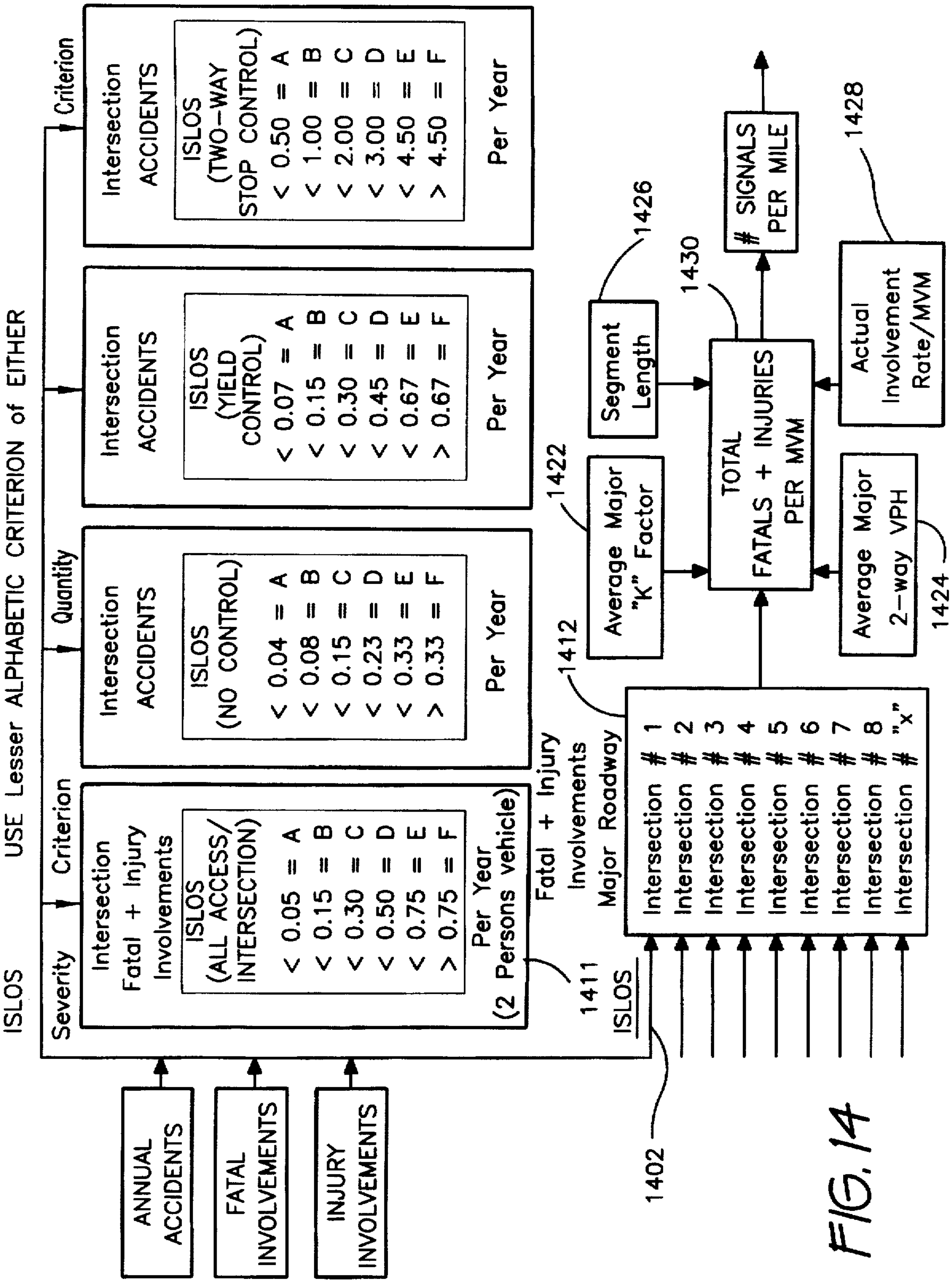
Figure 15:
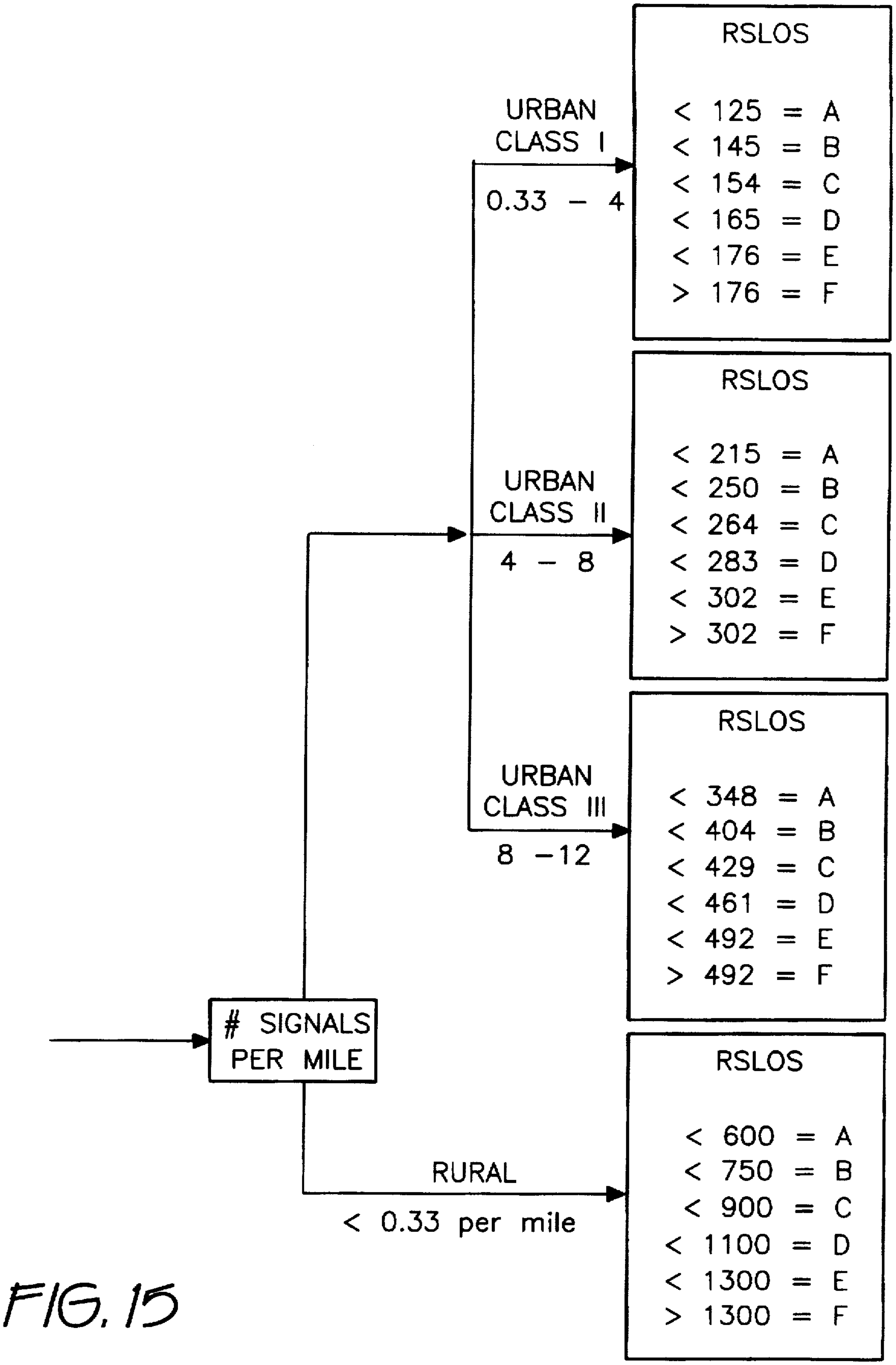

The flow chart for the TRAF-SAFE Program is divided into two distinct calculation areas, the accident calculation process and the interpretation process. FIGS. 4–12 calculate the total number of annual accidents expected at an intersection given the data collected. FIGS. 13–15 reduce the calculated values to injury and fatality involvements and to relative ratings called Safety Levels of Service (SLOS) which can be used to compare the safety level of an intersection examined to other intersections or to compare safety levels of roadway segments comprised of the individual intersections.

FIGS. 4–12 represent an iterative process for determining the expected number of accidents as a sum of the conflict opportunities for the various permutations of intersections, approaches, lanes, traffic signals, and accident models along a roadway. To determine the data required to be entered into the data blocks of FIGS. 4–7, it is necessary to work backwards through the flow chart to determine the exact scenario under investigation.

FIGS. 9–12 have as their output the number of accidents produced by each of the four accident models (angle, rear-end, side-swipe, and fixed object), which when summed produce the total expected accidents for the intersection. The accidents caused in each accident mode are calculated as a function of the number of conflict opportunities occurring for the accident mode.

The statistically probable conflict opportunities (SPCO) for each accident model are calculated as the sum of the SPCOs for the accident model during each phase of the traffic signal. The three possible phases of the traffic signal, as shown in FIGS. 8–12, are stop, go, and caution. Where an intersection has less options, such as a lane ending in a stop sign would only have a stop mode, the SPCOs for the lane during the non-possible phases will be reduced to zero, as will be discussed in greater detail further below.

Figure 2:
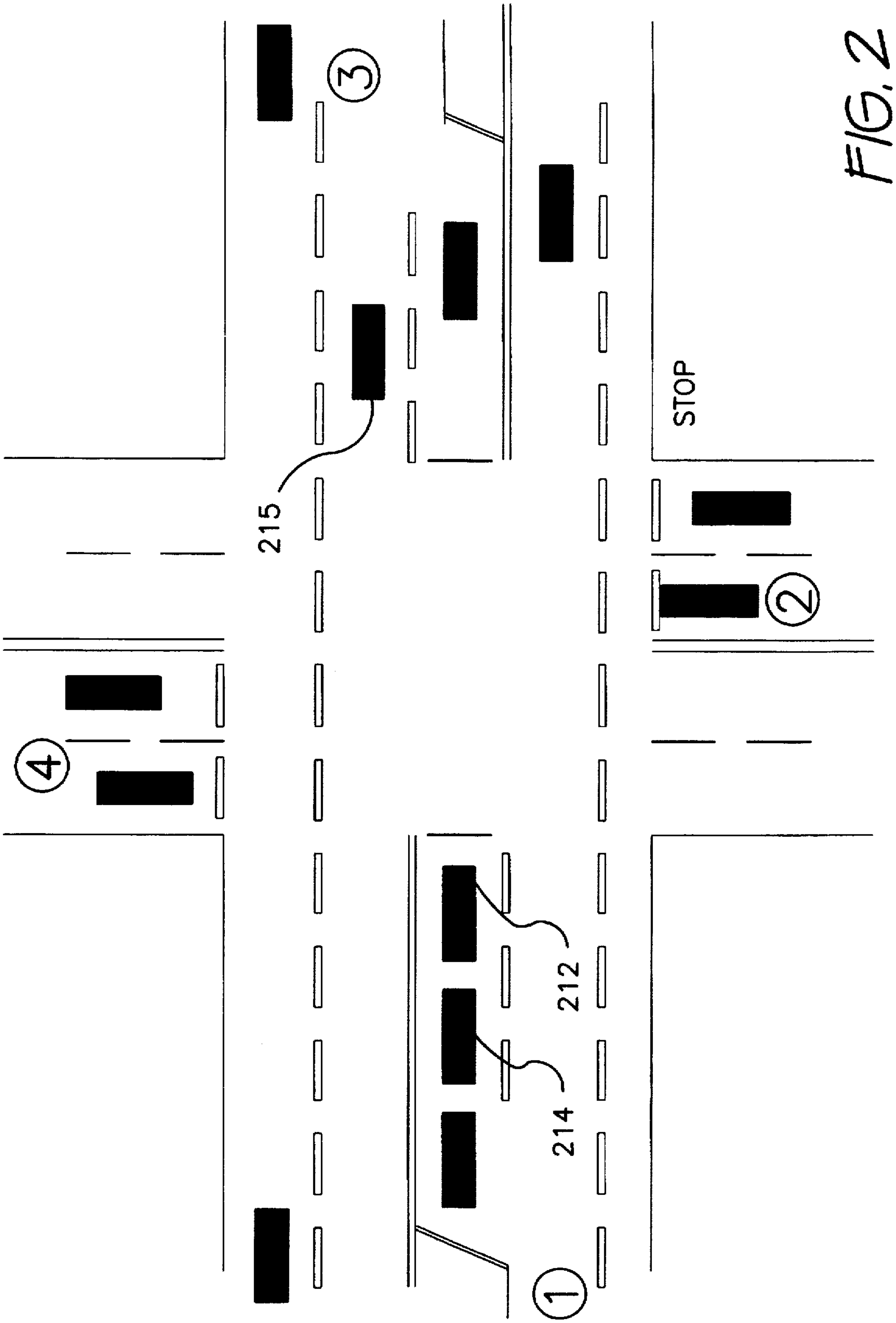
FIG. 2 is a diagrammatic view of a traffic intersection showing intersection and roadway features which are used as partial input to the present invention.

The SPCOs for each traffic signal phase is calculated by summing the SPCOs for each approach lane for each traffic signal mode for each accident model. In a four approach intersection as shown in FIG. 2, the SPCOs for each left turn, through lane, and right turn lane (including turn bays and turning traffic without turn bays) for each successive approach must be calculated.

The SPCOs for each lane of each approach lane is in turn calculated by summing the number of SPCOs caused by opposition from each possible lane of each approach to the traffic flow lane under consideration during each traffic signal for each accident mode. This calculation is diagrammed in FIG. 4, and is the basic iteration of the flow chart, which is recalculated for each permutation of roadway factors.

With the accidents determined, FIGS. 13–15 are used to interpret the data. The accidents for each accident mode are summed to determine the total accidents expected for the intersection. The total accidents are converted into total number of fatal, injury, and property damage involvement's according to studies of the area or according to compiled data. The fatal and injury involvements are then summed and compared to a chart developed by the present invention to determine an Intersection Safety Level of Service, with a rating of A–F as indicated in FIG. 14.

The individual intersections are then summed to find a roadway total number of fatal and injury involvement's, and based on the spacing of the intersections, traffic flow variables, and prior published accident rates for roadways of this type, a Roadway Safety Level of Service (RSLOS) is determined.

Both intersection and roadway Safety Levels of Service can then be used to project needed funding levels for improving the intersections and roadways, by improving or closing access connections and intersections to improve safety, and for comparing the intersections and roadways to disparate intersections and roadways in other geographic areas to determine comparative issues. The use of the relative information determined by the model provides an objective tool for measuring traffic safety levels of particular intersections and roadway segments which has not been before available.

D. THE BASIC ITERATION OF THE FLOW CHART

Referring to the traffic pattern shown in FIG. 2, the basic iterations and block definitions of the flow chart will be described. Beginning with FIG. 6, an analysis is made of each possible entering traffic flow and the likelihood of a possible conflict opportunity with other vehicles (opposition flow) entering the same intersection from each possible approach. For the purposes of clarification, opposition flow will refer to any traffic flow regardless of its speed or direction, which may conflict with the lane under consideration. The opposition flow is the same as the traffic flow, except that it represents a particular portion of traffic flow which is being analyzed with its potential to conflict with another portion of the traffic flow. In this example, a rear-end conflict opportunity will involve two vehicles traveling in the same direction, where the traffic flow would be the likelihood of a Left Turning vehicle 212 (FIG. 2) traveling in the particular lane (here, left turn bay 216) of a particular approach (1) under consideration, and the opposition flow would be the likelihood of a vehicle 214 traveling in the same direction 1 which occurs within the time period that the traffic flow vehicle (212) must wait within the intersection waiting for an opportunity to turn left across Approach 3 volume.

Similarly, an angle conflict opportunity will involve two vehicles traveling in opposing directions, where the traffic flow would be the likelihood of a left turning vehicle 212 (FIG. 2) traveling in a particular lane (here, left turn bay 216) of a particular approach, under consideration, and the opposition flow would be the likelihood of vehicle 215 traveling in the through lane of Approach 3 which occurs within the time period that the traffic flow vehicle 212 is theoretically exposed within the intersection from the time the left turn is begun until the vehicle 212 rear is fully protected from conflict with the approach 3 through vehicle 215.

Figure 6:
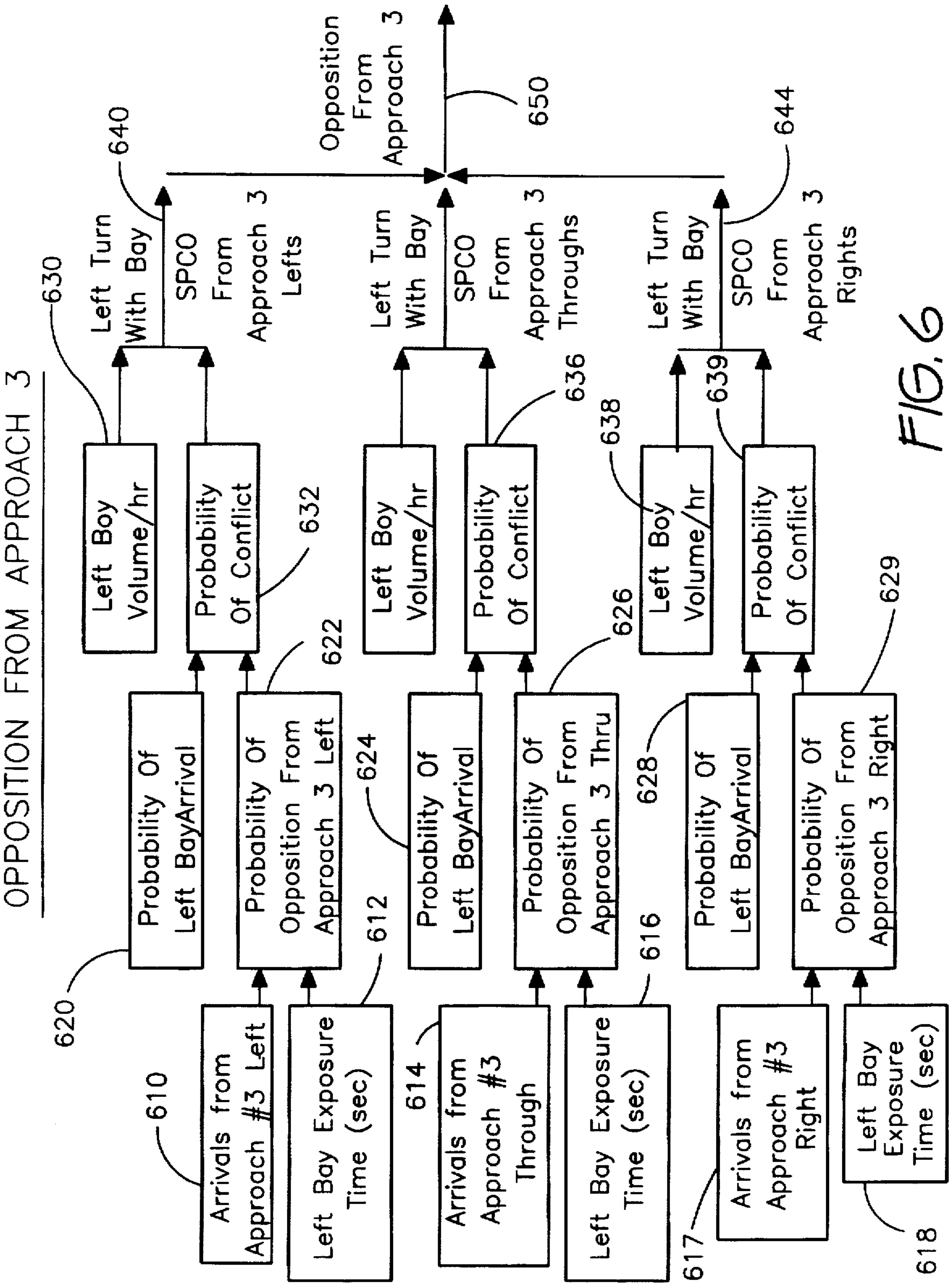

Because the calculations are iterative, it is necessary to work backwards through the flow chart to determine the particular intersection Safety Level of Service 1411 (see FIG. 14), Total Annual Accident Model 1320 (FIG. 13) (angle, rear-end, side-swipe, or fixed object), the traffic signal mode 920,1020,1120,1220 (FIGS. 9,10,11,12, respectively) (stop, caution, and red), and particular lane 830 (FIG. 8) under consideration. The initial calculation is made to determine the total annual accidents for the first intersection 1402 occurring as angle accidents 960 (FIGS. 9,13) which result from conflict opportunities during a Green Signal (go signal) 922 (FIG. 9) from traffic flow in the Left Turn Bay 821*a* (FIG. 8) of approach 1, and from opposition in all lanes 813 of Approach 3. FIG. 6 represents the calculation process for determining the number of angle conflict opportunities occurring in this one particular scenario. By using the data which corresponds to this scenario, the conflict opportunities resulting from the Approach 1 left turn (angle) movement can be determined.

The calculation of each block of the flow diagram of FIG. 6 is as follows:

1. ARRIVALS FROM OPPOSITION APPROACH #3 LEFT, THROUGH AND RIGHT (610, 614, 617)

The statistical likely number (quantity) of arriving flow made up of vehicles entering the left turn bay, through and right turn lanes of approach 3 per hour. This number may be an average for the day, or may be calculated as the sum of discrete time intervals to distinguish the rush hour numbers from non-rush hour. Empirical data collection methods such as pressure cables, electronic or mechanical means or other means may be used to determine the current traffic flow quantity.

2. LEFT BAY ARRIVAL EXPOSURE TIME (SECONDS) (612, 616, 618)

The SPCO Angle model rests upon the determination of the time a vehicle requires to complete various turning maneuvers at an intersection as a function of the geometry, approach speed and traffic control of the intersection. Using this form, the critical gap is also the exposure time for a turning vehicle. Both STOP and YIELD (Caution) models are of the form:

Exposure time of critical gap(sec)=a+b(Speed)+c (Intersection width)+d(Vehicle length)

In other words, the amount of time that an automobile is exposed within an intersection is a weighted function of the geographical factors of the intersection and the speed and dimensions of the vehicle. The higher the speed, the less time in the intersection; the greater the width of the intersection, the more time the vehicle will be in the intersection; and the greater the length of the vehicle, the longer the vehicle will take to clear the intersection.

One such source which has tabulated the results of these calculations for each permutation of data is the Critical Gap model found in the 1985 Highway Capacity Manual. Preferably, the results of these tables are used as input into the calculations to determine the exposure time for a vehicle in an intersection. For conflicts with through vehicles which are not intended to stop, the exposure time of the through vehicle with a conflict from an entering side-road vehicle is dependent upon the time to safely stop the through vehicle (assuming adequate sight distances for all drivers). Prior research of through vehicle stopping time versus speed is documented in prior art.

3. PROBABILITY OF LEFT BAY ARRIVAL (620, 624, 628)

P(Angle Arrival)=either 0 or 1 depending on whether the conflict can occur.

4. PROBABILITY OF OPPOSITION FROM APPROACH 3 TO LEFT TURN ARRIVAL MOVEMENT DURING ARRIVAL EXPOSURE TIME (622, 626, 629)

Assuming a random distribution of traffic over the time period under consideration, the likelihood of a vehicle from Approach 3 occurring or appearing during the time period for the Approach 1 left turn vehicle to complete its maneuver can be calculated using a Poisson or similar statistical distribution as follows:

$$P(\text{Opposition to Arrival during exposure time})=P(L,T,R,)=(1-e^{-qt/3600})=P\text{ (one arrival)}$$

where:

q=average arrival rate(vph) of opposing flow from Approach 3 left, through or right vehicles per lane per unit time, and t=Arrival exposure time (HCM critical gap or safe stopping time for through vehicle- sec)

5. Probability of Angle Conflict per Vehicle 632, 636, 639:

P(SPCO-Angle Conf./vehicle)=P(Arrival)*P(Opposition to Arrival during arrival exposure)

6. Left Bay Volume/hr (630, 636, 638)

The number of vehicles entering the left bay of approach 1 per hour. This number may be a statistical estimation, or may be determined in conjunction with data collected from the intersection by photologs or pressure cables or other means. While the flow diagram is drawn to show only an average traffic flow averaged for the year, the number may be a summation of discrete calculations made with tabulated flow rates for each hour or group of hours to account for rush hour traffic and non-rush hour traffic, to more accurately portrait the daily variations in flow rates to account for rush hour, etc.

7. Angle SPCOS For Left Turn with Bay For Approach 1 with Lefts from Approach 3 Opposition (640):

Approach 1 Left Turn Bay SPCOs=$P_{1L\text{-}3L}$(SPCO-Angle Conf/(vehicle/hr.))*Left Bay Volume/hr.

8. Angle SPCOs for Left Turn with Bay for Approach 1 with Throughways from Approach 3 Opposition (642)

Approach 1 Left Turn Bay SPCOs=$P_{1L\text{-}3T}$(SPCO-Angle Conf/vehicle)* Left Bay Volume/hr.

9. Angle SPCOs for Left Turn with Bay from Approach 1 with Rights from Approach 3 Opposition (644)

Approach 1 Left Turn Bay SPCOs=$P_{1L\text{-}3R}$(SPCO-Angle Conf/vehicle)* Left Bay Volume/hr.

10. Total Angle SPCOs for Left Turn with Bay (650)

The summation of blocks 640, 642, and 644 which represent the SPCOs from opposition from Approach 3 Lefts, Throughways, and Rights, respectively, to the traffic flow in the Left Turn Bay of Approach 1, adjusted to annual SPCO's.

E. COMPLETING THE FLOW CHART

1. CALCULATION OF THE TOTAL ANGLE CONFLICT OPPORTUNITIES

Figure 4:
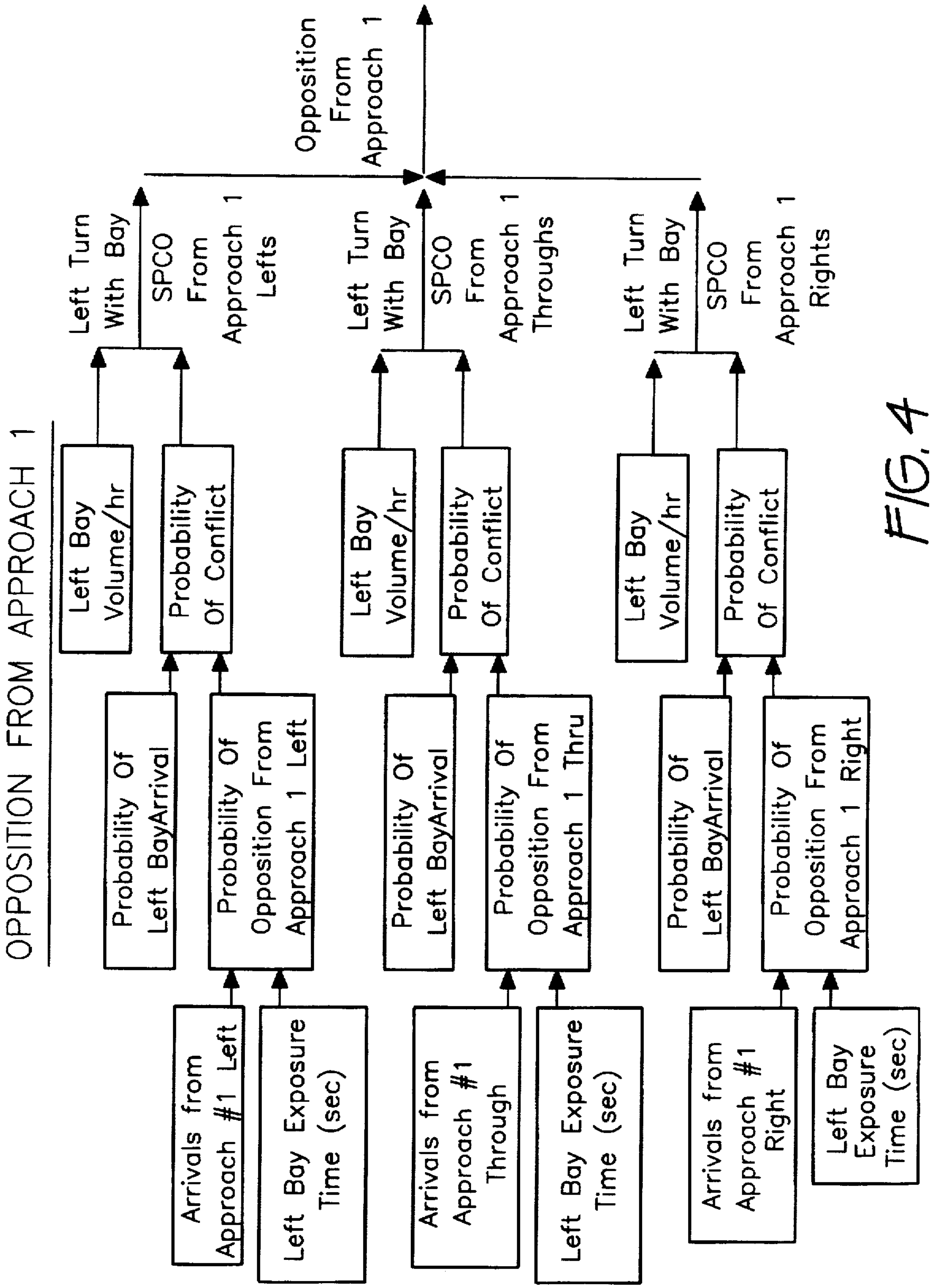
Figure 5:
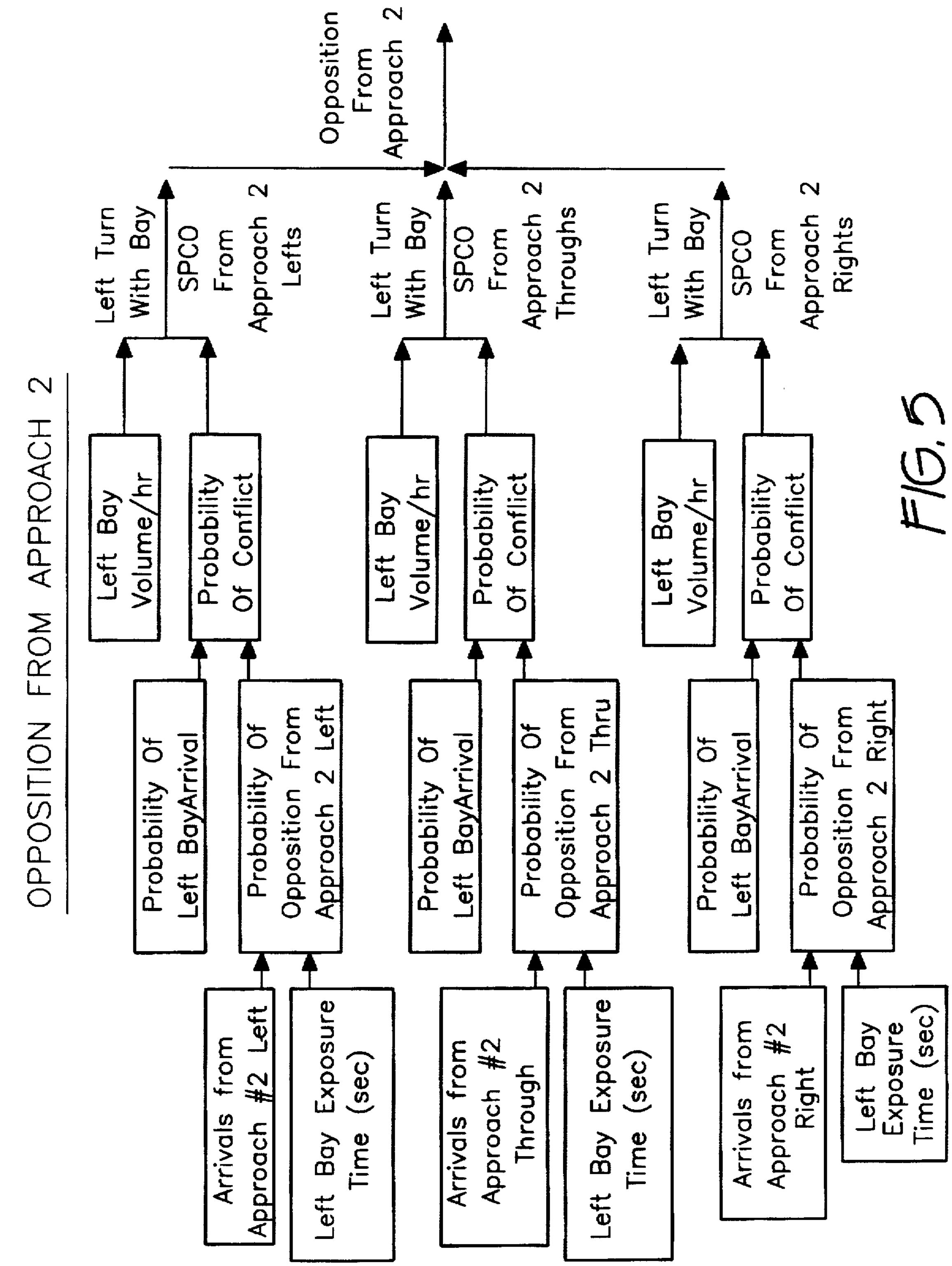
Figure 7:
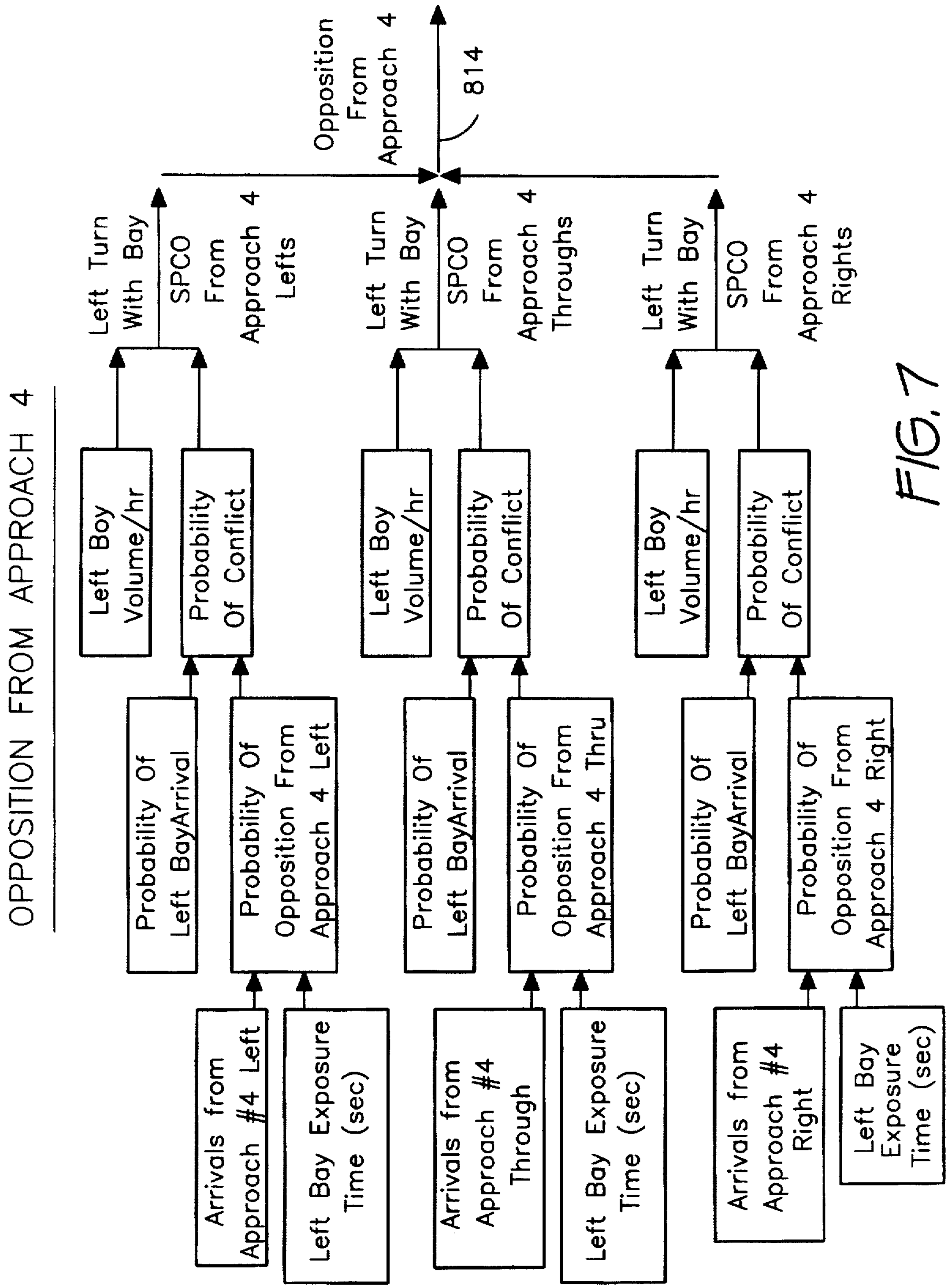
Figure 8:
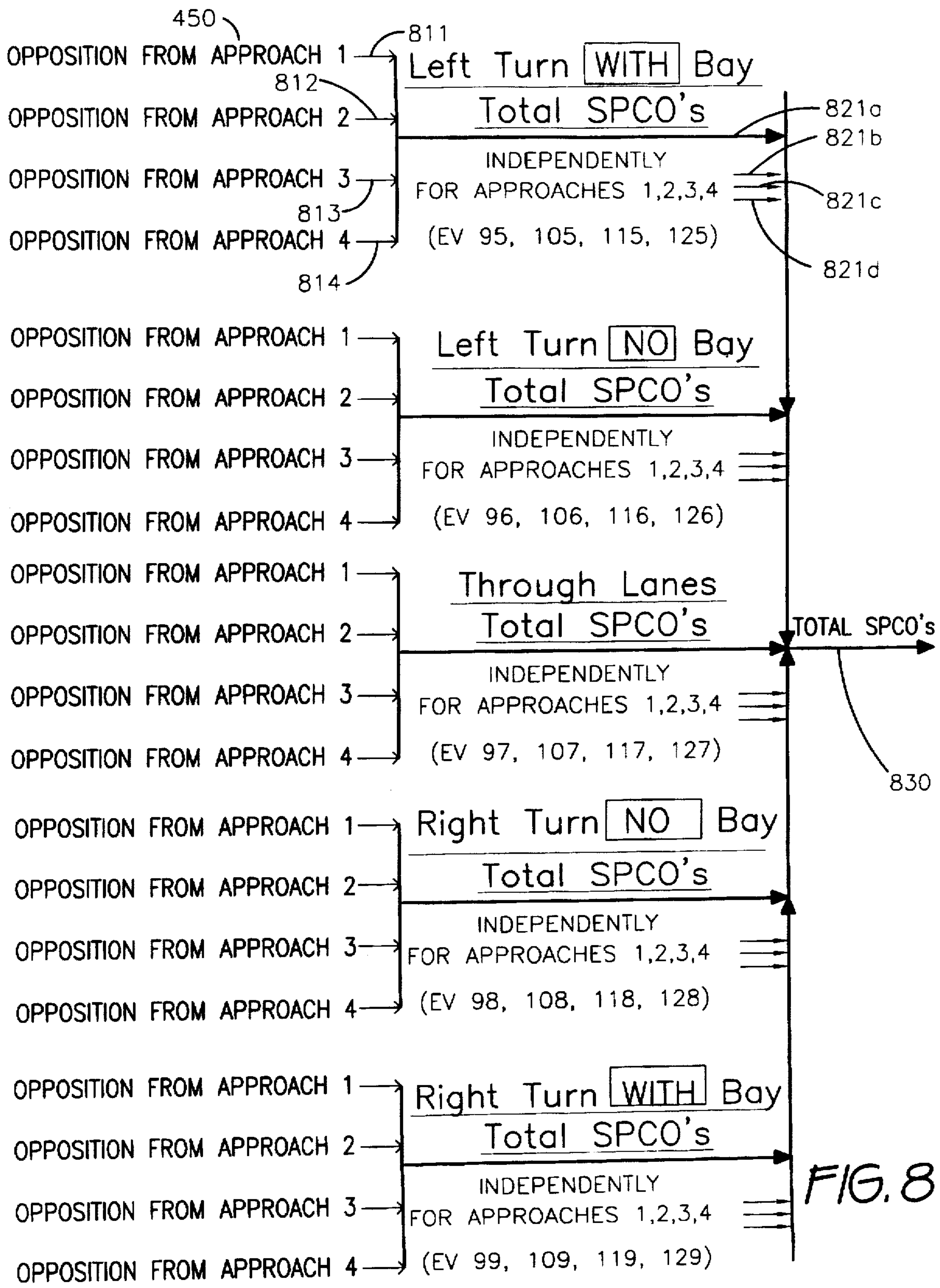
Figure 9:
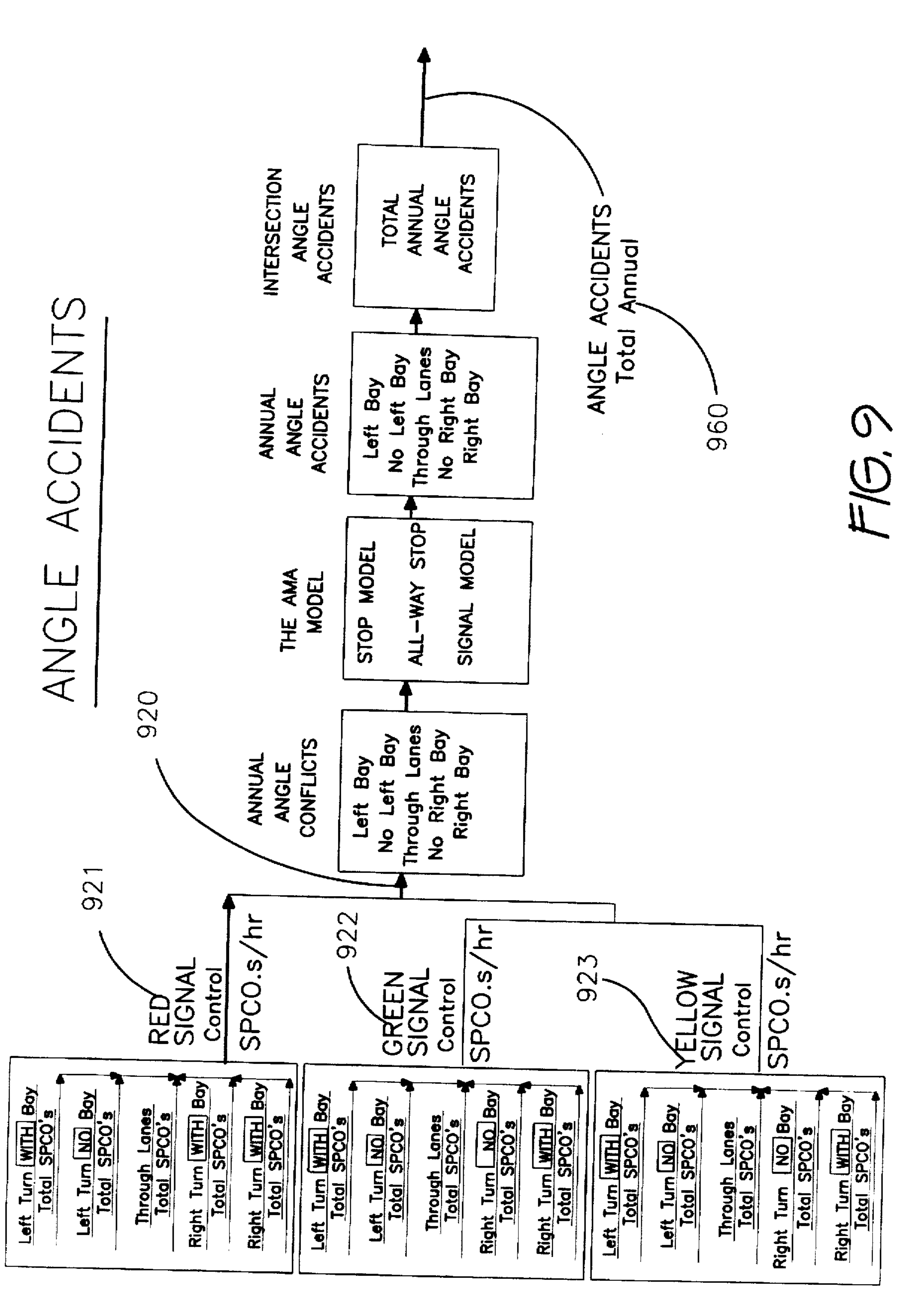

Once the total SPCOs for Left Turn with Bay for Approach 1 for opposition from Approach 3 is completed, the total angle SPCOs are calculated for opposition from Approaches 1, 2, and 4 or more in a similar manner using FIGS. 4, 5, and 7, respectively to determine the Total Angle SPCOs for the Left Turn Bay of Approach 1 for opposition from all directions 821*a*. The calculations are then reiterated for the Left Turn Bay Lane of each Approach (821*b*, 821*c*, 821*d*) to achieve the Total Left Turn Bay Angle SPCOs for all approaches 821.

Similar calculations are then made for successive traffic flow lanes of each approaches to determine the Total SPCOs for all lanes of all approaches 830, recognizing that these calculations are being made only for angle accident mode conflicts in a Green Light (go mode) 922 for the first intersection.

The calculations of FIGS. 4–8 are then performed again with data changed to determine conflicts for all lanes of all approaches and their respective oppositions under a Red Signal (stop mode) 921 for Angle Accident Model conflicts occurring at the first intersection. Since traffic is stopped during stop mode, no angle accidents can occur during a stop mode, thus the red mode angle accidents will equal zero. Note that Sideswipe and Rear-end accident may occur during a stop mode.

A third iteration is then completed for all lanes of all approaches and their respective oppositions under a Yellow Signal (caution mode) 923 for Angle Accident Model conflicts.

2. PROBABILITY OF REAR-END CRASH

Figure 10:
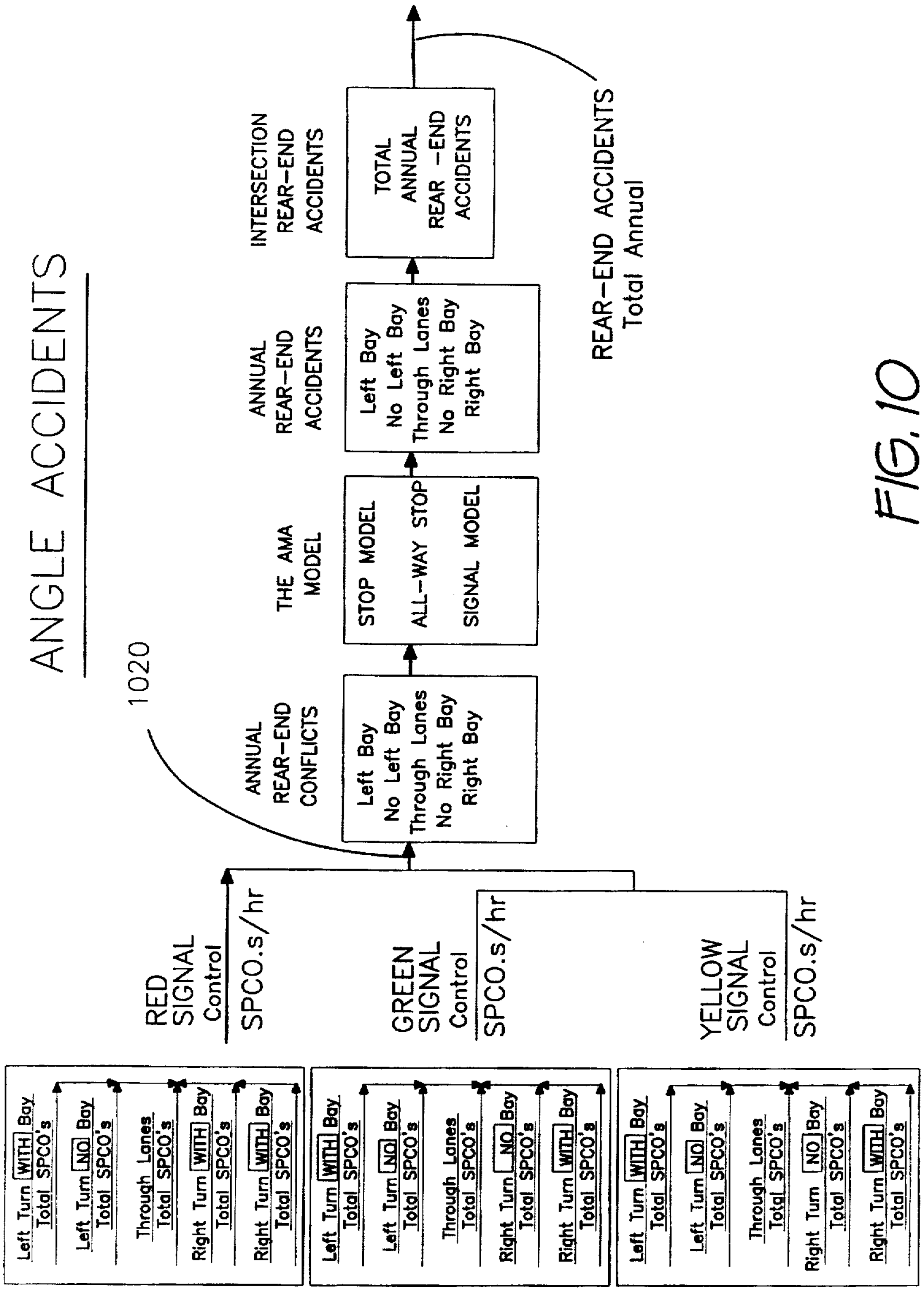
Figure 11:
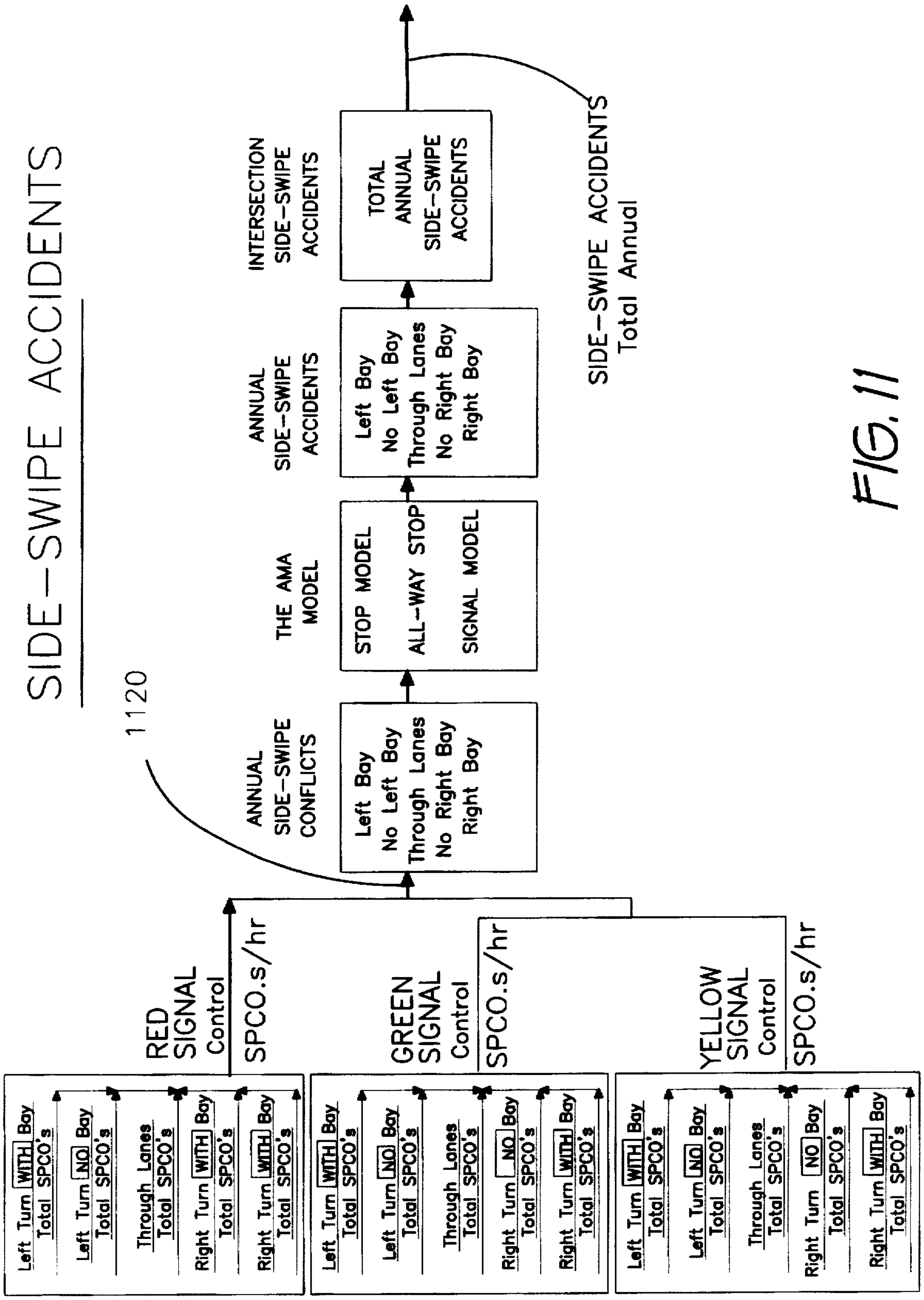

Once the input data 920 for determining the Total Annual Angle Conflict Opportunities has been calculated by the above steps, the process is repeated to determine the total number of Rear-End Accident Model conflicts 1020 according to FIG. 10, where the Rear-end Conflict Opportunities are defined as follows:

The Rear-end conflict opportunity model operates in a similar manner as the angle model (except that protected bays cannot generate Rear-end SPCO's unless the bay storage length is exceeded) in that:

SPCO(Rear-end Conf./hour)=Approach Volume/hr*P(SPCO-Rear Conflict/vehicle)

where:

P(SPCO-Rear Conflict/veh)=P(Rear Arrival)*P(Opposition during arrival exposure time)

where:

P(Rear Arrival)=0.0 for no-stop, 1.0 for stop control, or if signalized, this is percent red time or 1−(green/cycle time), P(Opposition from Rear during arrival exposure)=P(1) $=(1-e^{-qt})$, where:

q=arrival rate of rear flow , and t=exposure time of stopped vehicles or stop duration where for Stop Control:

Stop Duration(sec) = $E$(Wait time in system) − $E$(service time) = Expected # in System/Arrival rate − Critical Gap and:

Expected Number # in System = $P(1)/P(0)$ = $(1-e^{-m})/(e^{-m}) = (1-e^{-m})*(e^{m})$, thus $$\text{Stop Duration(sec)}=\{\{(1-e^{-qt/3600})*e^{qt/3600}\}/(q/3600)\}-\text{Crit. Gap}$$

and:

q=arrival flow of stopping vehicles (vph)

t=time to service each stopped vehicle (critical gap-sec.)

and for Signalized control:

Stop Duration(sec)=Webster's Model or similar model of Stop Delay.

3. SPCO SIDESWIPE CRASH MODEL

With the Rear-End Accident Model conflict opportunity calculations completed, the iterative calculations of FIGS. 4–8 must be completed for Side-Swipe Accidents. This model uses as defaults the lane distribution models found in the FHWA "ROADSIDE" Program which relates lane distribution to approach volumes. The Roadside Program presents two models of lane distributions (depending upon approach widths) and given these, probable sideswipe conflict opportunities are the result of the given lane distribution and the potential shift to another lane.

The SPCO Sideswipe Model operates similarly to the angle and rear-end models:

SPCO (Sideswipe Conflicts/hr)=Lane Shift Volume/hr*P(SPCO-Sideswipe Conflicts/veh.)

where:

P(SPCO-Sideswipe Conflict/veh)=P(Sideswipe Arrival)*P(Opposition to lane shift)

where:

P(Sideswipe Arrival)=P(Lane shift)=Either 1.0 for volumes which must shift lanes to make an approaching turn movement or to a conservative surrogate of lane utilization for through volumes in shared lanes where through volumes will shift lanes depending on the utilization of the turn lane, and P(Opposition to lane shift)=Probability of simultaneous arrival of two or more vehicles in the entry lane during the default merge headway. The default merge headway is the Minimum Time Gap required to merge into an opening of a defined headway:

P(Opposition to lane shift)=P(>=2)=1−{(P(0)+(P(1)} where:

$P(0)=e^{\{-q*t/3600\}}$ $P(1)=e^{\{-q*t/3600\}}*\{qt/3600\}$ and:

q=average arrival rate (left+through+right in entry lane-vph), t=default merge headway=Minimum time gap required for a vehicle to merge into the adjacent lane.

Assuming merge headways for intersections correspond to merge headways for single lane ramps, the minimum time gap required may vary from 2 seconds at saturation to 6 seconds in free flow conditions over the range of 600–1700 vph and speeds from 15–55 mph. In addition, this variable may be user defined. The default merge headway is synonymous with default merge distance since merge distance increases as speed increases.

In other words, the probability of any two vehicles being close enough to restrict a vehicle in the adjacent lane from entering in the hour is the above probability of opposition multiplied by the number of default merge headways (minimum merge time gaps available) in the hour.

4. THE SPCO FIXED OBJECT OR SINGLE VEHICLE ACCIDENT MODEL

Figure 12:
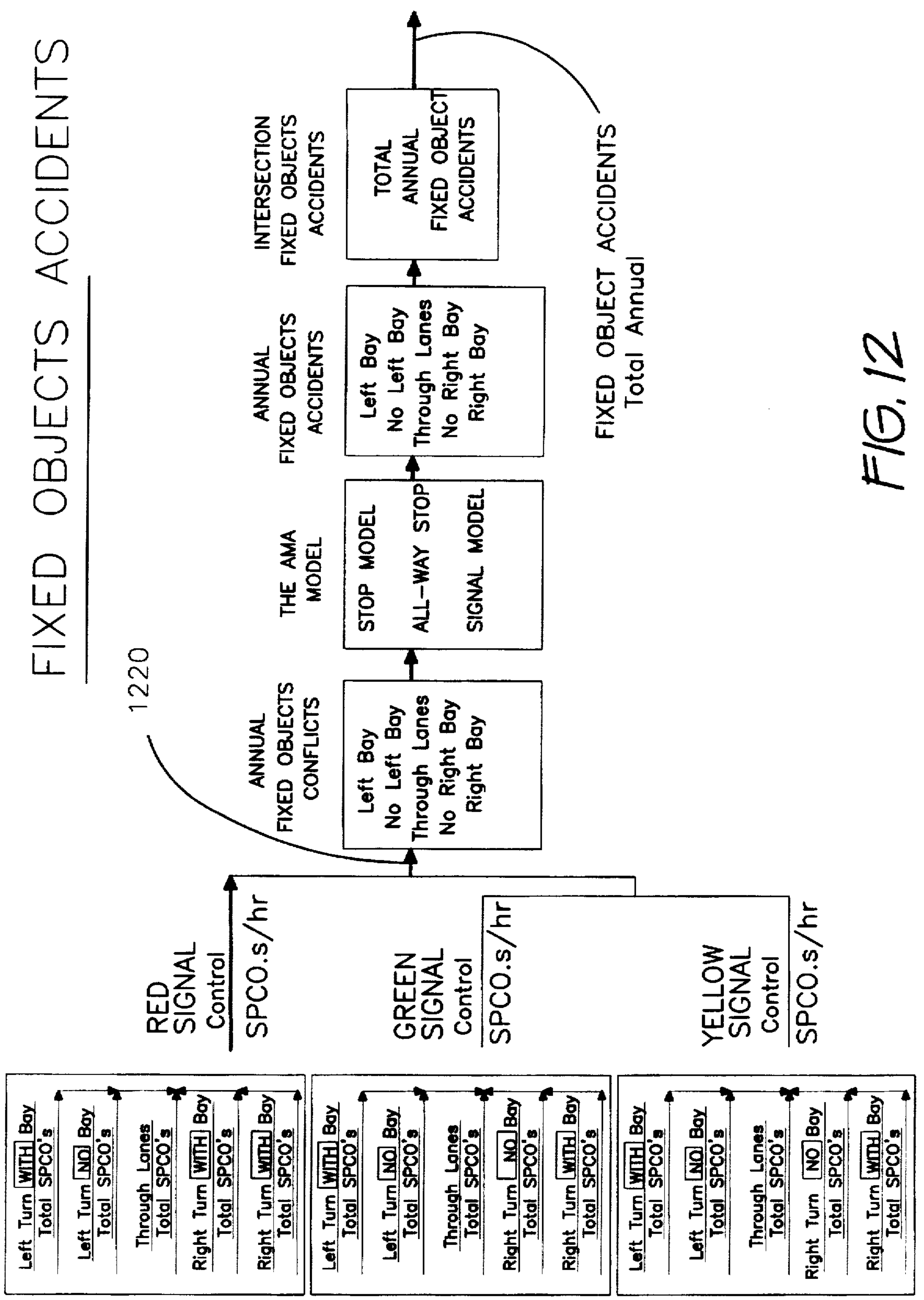

The next step necessary in determining the total number of accidents at a particular intersection ARE the calculations according to FIG. 12, which must be performed for the Fixed Object or Single Vehicle Accident Model. The Fixed Object/Single vehicle Module represents those type of crashes in which the driver leaves the confines of the outside or nearside pavement lane and strikes a roadside object which may be either fixed or moveable (trees, pedestrians, bicycles etc.). One would appreciate that, in an effort to incorporate roadside (non-intersection) capability, the TRAF-SAFE Program could incorporate input from current fixed objection calculation sources, including the FHWA "Roadside 4.2" program which is capable of being altered to accept pedestrians and other moveable fixed objects with independent speed sensitive severities. One would appreciate that the TRAF-SAFE program could incorporate both intersection related and non-intersection (open roadway) fixed object accident capabilities making the model a full Roadway and Intersection Safety Management Model as opposed to its present use as an access related safety management tool.

Because fixed objects are generally small contributors to total access accidents, it is preferable to use a simplification option with a default rate-based (exposure) generator to develop stable Fixed Object/Single Vehicle Intersection Accident estimates without the need to collect significant additional fixed object type and location data. Use of this method greatly reduces the time necessary to collect data on a particular intersection without sacrificing the predictive abilities of the traffic safety prediction model.

The form of the default fixed object model is as follows:

Accidents/hr={Lane volume(vph)/Total Entering (vph)}* {Entering Vehicles*Fixed Object Accident Rate(acc)/mev} where:

Fixed Object Accident Rate (accidents/mvm)= Individualized exposure models from prior research for different traffic control types of the following general form:

$a_1$–$b_1$ (Entering ADT)*(% Fixed Object Accidents)

It should be recognized that Fixed Object/Single Vehicle accidents generally occur to vehicles in the right-most lane, thus such accidents on multi-lane roadways may often not exceed similar accidents on similar volume 2-lane roadways since both have only one right-most lane which is capable of generating Fixed Object/single vehicle accidents. Thus vehicles in lanes which are not the right-most lane in the same direction are assumed not to contribute to Fixed Object/Single Vehicle accidents because the distance to the roadside is increased which permits an opportunity to avoid the fixed object.

5. SUMMARY OF SPCO CONFLICTS AND CONVERSION TO ANNUAL ACCIDENTS

The total number of conflict opportunities for each of the above four models must be converted to a total number of accidents. The fundamental mechanism of this conversion is the AMA Model which is a stable mathematical conflict/accident ratio for each traffic control type over all typical geometries, volumes, and traffic control types and operates as:

$$\text{Intersection Accidents/yr} = \frac{\text{Sum } SPCO \text{ Conflicts per year}}{\{\{AMA \text{ Model}\} \text{ Conflicts/Accident}\}}$$

where:

Sum SPCO Conflicts/yr=$a_1$(SPCO Angle Conflicts)+$a_2$ (SPCO Rear-end Conflicts)+$a_3$ (SPCO Sideswipe Conflicts)+$a_4$ (SPCO Fixed Object or Single Vehicle Conflicts)

where: the $a_1$–$a_4$ coefficients are used as calibrators for state and/or local data or individual site use of the model, and:

AMA Model Conflicts/Accident=The AMA Model itself is a complex, multiple linear, marginally decreasing relationship between accidents and SPCO's for intersections which has been calibrated with rate based and other models to produce annual intersection accidents estimates over a wide variety of geometric configurations and traffic conditions. The general form of the AMA model is:

Conflicts/Accident=f(Minor Volume)−f(Major Volume)+Minor Terms

The AMA model operates such that if there is no minor volume, there can be no accidents, and as the major volume increases, the occurrence of accidents decreases on a per conflict basis, thus producing a marginally decreasing form as presented in FIG. 16. The figure shows the conversion from conflicts to accidents at selected volume levels with the expected marginally decreasing number of conflicts per accident as volume rates increase. Determination of the number of accidents from the number of conflicts is made by reading the number of conflicts per accidents for the particular flow rates through the intersection, and dividing the number of conflicts by this conflict per accident rate. However, this is but one of a family-of-curves which result from the application of the above model.

Summation of the resulting accidents for each of the four accident models (angle, rear-end, side-swipe, and fixed object) results in the total annual accidents from SPCOs or default models for the intersection. The total can then be used to determine the safety or hazard level of the intersection, and the sum of these totals for a each intersection along a roadway can be used to determine the safety level of the roadway.

F. EXAMPLE CALCULATIONS OF SPCOS, AND ANNUAL ACCIDENTS, INJURIES, AND FATALITIES FOR A SIMPLIFIED TRAFFIC PATTERN

Figure 3:
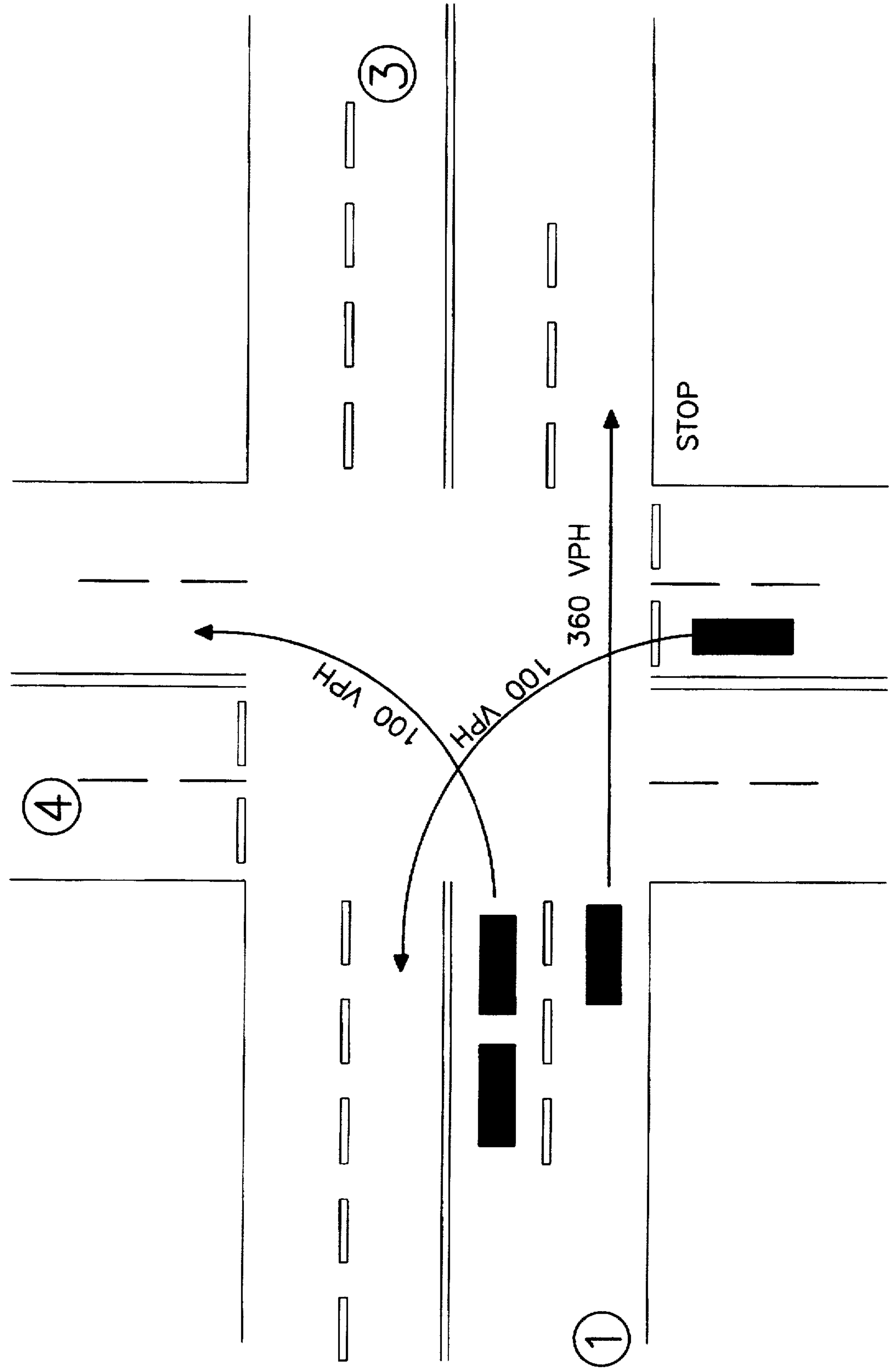
FIG. 3 is a diagrammatic view of a traffic intersection showing a traffic flow pattern of a particular intersection.

As an example using the intersection diagrammed in FIG. 3, the subject intersection has only three entering movements in the peak hour, that is no traffic enters from approaches 3 or 4. The only traffic flowing into the intersection is two lanes of traffic from the major approach 1, with a number of vehicles turning left and a number of vehicles going straight through the intersection. Traffic from minor stop-controlled approach 2, a minor flow turns left across the main traffic flow. No other traffic is entering the intersection.

Also, for the purpose of simplicity, none of the approaches has turn bays, and each has two lanes of flow. On the minor stop controlled approach (direction 2), 100 vph enter (24 ft. approach-stop controlled, 30 mph with critical gap=7.75 sec.) turning left across the path of 100 vph turning left on the major street (critical gap=5.65 sec.) and also across the path of 360 vph through vehicles on the major street (24 ft. approach-no control at 45 mph). Note that traffic flows and opposition flows which are not possible reduce to zero and are left out of the example for simplicity and clarity.

1. ANGLE STATISTICALLY PROBABLE CONFLICT OPPORTUNITIES

With no bays or medians, the Angle Conflict SPCO's for all movements are:

a. For the Left SPCO on major(100 vph) roadway due to left(100 vph) on minor street:

SPCO(Angle Conf./hour) = Approach Volume/hr × P(SPCO-Angle Conflict/vehicle)
= 100 vph × P(SPCO-Angle Conflict/vehicle)
where:
P(SPCO-Angle Conflict/veh) = P(Arrival) × P(Opposition during arrival exposure time)
where:
P(Arrival) = 1.0 and thus this conflict can occur, and
P(Opposition during arrival) = P(1) = $(1 - e^{-qt/3600})$,
where:
q = arrival rate of opposing flow(100 vph), and
t = exposure time arrival flow (5.65 sec. critical gap)
P(SPCO-Angle Conf./veh) = $1.0 \times \{1 - e^{-(100\times5.65/3600)}\}$
= $1.0 \times \{1 - 0.8547\} = 0.1453$
and thus for the Left minor to Left major:
SPCO(Angle Conf/hr) = 100 vph × 0.1453 SPCO(Angle Conflicts/vehicle)
= 14.53 × SPCO(Angle Conflict Opportunities/hour)

b. For the Through SPCO on major(360 vph) roadway due to left volume(100 vph) on minor:

SPCO(Angle Conflicts/hr)=360 vph*P(SPCO-Angle Conflict/vehicle)

where:

P(SPCO-Angle Conflict/veh)=P(Arrival)*P(Opposition during arrival exposure)

where:

P(Arrival)=1.0 and thus this conflict can occur, and

P(Opposition)=P(1)=$(1-e^{-qt})$.

where:

q=arrival rate of opposing flow(100 vph), and t=exposure time of arrival flow (7.9 seconds). The arriving flow (q) on the major street has no traffic control (uncontrolled approach) and is thus exposed to conflict from the sidestreet for a time which is dependent on the time to stop safely given the blockage of the intersection by for example a stalled entering vehicle. The safe stopping time is a function of the approach speed and ranges from 6.8 seconds at 20 mph to 8.5 seconds at 55 mph.

---

P(SPCO-Angle Conflicts/veh) = 1.0 × {1 − $e^{-(100\times 7.9/3600)}$}
= 1.0 × {1 − 0.80296} = 0.1965
and thus for the Left minor to Through major conflicts:
SPCO(Angle Conflicts/hr) = Approach Vol/hr × P(SPCO-Angle Conflict/vehicle)
= 360 vph × 0.1965 SPCO(Angle Conflicts/vehicle)
= 70.74 SPCO(Angle Conflict Opportunities/hour)

--- c. For the Left SPCO on minor (100 vph) roadway due to left volume (100 vph) on major roadway:

---

SPCO(Angle Conflicts/hr) = 100 vph × P(SPCO-Angle Conflict/vehicle)
where:
P(SPCO-Angle Conflict/veh) = P(Arrival) × P(Opposition during arrival exposure)
P(Arrival) = 1.0 and thus this conflict can occur, and
P(opposition) = P(1) = $(1 - e^{-qt})$,
where:
q = arrival rate of opposing flow(100 vph), and
t = exposure time of arrival flow (7.75 sec. critical gap)
P(SPCO-Angle Conflict/veh) = 1.0 × {1 − $e^{-(100\times 7.75/3600)}$}
= 1.0 × {1 = 0.8063} = 0.1937
= 100 vph × 0.1937 SPCO Angle conf./veh.
= 19.37 SPCO (Angle Conflict Opportunities/hour)

--- d. For the Left SPCO on minor(100 vph) due to through volume(360 vph) on major:

---

SPCO(Angle Conflicts/hour = Approach Volume/hr × P(SPCO-Angle Conflict/vehicle)
= 100 vph × P(SPCO-Angle Conflict/vehicle)
where:
P(SPCO-Angle Conflicts/veh) = P(Arrival) × P(Opposition during arrival exposure) where:
P(Arrival) = 1.0 and thus this conflict can occur, and
P(Opposition) = P(1) = $(1 - e^{-qt})$
where:
q = arrival rate of opposing flow (360 vph), and
t = exposure time of arrival flow (7.75 sec. critical gap)

-continued

---

P(SPCO-Angle Conflicts/veh) = 1.0 × {1.0 − $e^{-(360\times 7.75/3600)}$}
= 1.0 × {1 − 0.4607} = 0.5393
and thus for the Left minor to Through major:
SPCO(Angle Conflicts/hour = 100 vph × 0.5393 SPCO Angle Conf./veh.
= 53.93 SPCO (Angle Conflict Opportunities/hour)

---

Thus, for the 100 vehicles turning left during the hour from the stop controlled sidestreet, a total of 158.76 statistically probable conflict opportunities with the 100 lefts from the major street and 360 through vehicles on the major street will occur. Whether from left, through or right movements, each interaction will develop similar conflict opportunities which are then summed for the hour to generate Total Angle SPCO's for the hour. And with the use of k factors (or peak hour to daily ratios), the Angle SPCO's can be extended to daily and annual Angle Conflict Opportunities where the number of days of operation of the driveway or intersection may range from approximately 250 days per year for a driveway from an office building operating 8 A.M. to 5 P.M. weekdays only, up to 365 day per year for a typical intersections not influenced by summertime school hours.

2. REAR-END STATISTICALLY PROBABLE CONFLICT OPPORTUNITIES

From this example and referring to FIG. 3, for 100 vph on the minor street (7.75 seconds of left turn critical gap with the Probability of Stop on the minor street=1.0 waiting to enter a 100 vph left turn and 360 vph through flow on a major street:

a. For the Left SPCO on minor(100 vph) due to left volume(100 vph) on major:

---

SPCO (Rear-end Conflicts/hour = Approach Volume/hr × P(SPCO Rear Conflict/vehicle)
= 100 vph × P(SPCO-Rear Conflict/vehicle)
where:
P(SPCO-Rear-end Conf./veh) = P(Stop Arrival) × P(Rear Opposition)
where:
P(Stop Arrival) = 1.0 for stop control, and
P(Opposition from Rear) = P(1) = $(1 - e^{-qt})$
where:
q = arrival rate of rear flow (99 vph), and
t = exposure time of stopped vehicles or Stop Duration, and
Stop Duration = {{$(1 - e^{-m}) \times e^{m}$}/q} − Critical Gap
= {{1 − $e^{-\{100\times 7.75\}/3600}$} × {$e^{\{100\times 7.75\}/3600}$}/{99 vph/3600}} − (7.75)
= ({ 0.1937} × {1.240}/0.0277) − 7.75
= 8.648 − 7.75
= 0.897 seconds, thus
P(SPCO-Rear-end Conf/veh) = 1.0 × {1.0 − $e^{-\{99\times .897\}/3600}$}
= 1.0 × (1 − 0.9754)
= 0.0246
and finally:
SPCO(Rear-end Conflicts/hour) = 100 vph × 0.0246 (SPCO-Rear/veh)
= 2.46 SPCO (Rear-end Conflict Opportunities/hr)
b. For the Left SPCO on minor (99 vph) due to through volume(360 vph) on major:
SPCO(Rear-end Conflicts)/hour = Approach Volume/hr × P(SPCO-Rear Conflict/vehicle)
= 100 vph × P(SPCO-Rear Conflict/vehicle)
P(SPCO Rear-end Conflicts/veh) = P(Stop Arrival) × P(Rear Opposition)
where:
P(Stop Arrival) = 1.0 for stop control, and
P(Opposition from Rear) = 'P(1) = $(1 - e^{-qt})$, -continued where:
q = arrival rate of rear flow(99 vph) , and
t = exposure time of stopped vehicles or stop duration, and
Stop Duration = {{(1 − $e^{-qt}$}/q) − Critical Gap
= { 1 − $e^{\{360\times7.75/3600}$}× $e^{\{360\times7.75\}/3600}$/{360vph/3600}) − (7.75)
= ({0.5392} × (2.171}/0.100) − 7.75
= 11.706 − 7.75
= 3.956 seconds thus:
P(SPCO-Rear-end Conflicts/veh) = 1.0 × {1 − $e^{-\{99vph\times3.956\}/3600}$}
= 1.0 × {1 − 0.8959) = 0.1041 and finally:
SPCO(Rear-end Conflicts/hour) = 100 vph × 0.1041 (SPCO-Rear/veh)
= 10.41 SPCO (Rear-end Confiict Opportunities/hr)

In this example. 100 vph entering from a minor stop controlled approach into an intersection with 100 vph left turn and 360 vph through volume on the major approach will wait approximately 0.9 seconds due to the 100 vph major street left turn and 3.9 seconds due to the 360 vph through volume on the major street. Because of this waiting period, each vehicle stopping on the minor approach will experience 2.46 SPCO's due to the major left (100 vph) and 10.41 SPCO's due to the through (360) volume, and thus this approach with 100 vehicles stopping in the hour will have 12.87 statistically probable rear-end conflict opportunities per hour.

3. SIDESWIPE STATISTICALLY PROBABLE CONFLICT OPPORTUNITIES

In the example of FIG. 3: For 460 vph on the major street (with 2 lanes for 360 through and 100 vph turning left with no bay) operating at 45 mph, the "Roadside" 4.2 model places approximately 14% of the through flow (50 vph) in the left lane with 86% (312 vph) of the through flow in the right lane. Conversely, 86% of the left turn flow (86 vph) is already in the left lane with 14% (14 vph) in the right lane. Thus 14 vehicles must move from the right to the left lane where the left lane is already occupied by 50 through vehicles and 86 left turn vehicles. In addition, for 100 vehicles turning left from the sidestreet with no through movement, from "Roadside," it is assumed that 86 vehicles are in the left lane and thus 14 vehicles must merge into the left lane with the possibility of sideswipe. Using a default merge headway of 2 seconds (assuming saturation flow (LOS E) conditions):

a. For the Right to Left SPCO on the major approach (100 vph left turn). These are left turning vehicles on the major approach which are in the far right lane and must enter the left lane to turn left.

SPCO(right to left sideswipe Conflicts)/hour = Rt.to Left Volume/hr × P(SPCO sideswipe Conflicts/veh)
= 14 vph × P(SPCO Rt. to Lt. sideswipe/veh)
where:
P(SPCO Rt.-Lt. sideswipe/veh) = P(Arrival or lane switch) × P(Opposition to lane switch)
where: P(Arrival or lane switch) = P(Lane shift)
= 1.0(left turn vehicles must shift left)
and:
P(Opposition to lane shift) = probability of arrival of 2 or more vehicles in the entry lane with less than 2 seconds headway during the hour -continued is:
P(> = 2) = 1−{P(0) + P(1)},
where P(0) = $e^{-\{q\times t/3600}$}, and
where:
q = arrival rate in left lane = 136 vph {lefts(86) + thru's in left(50)},
t = default merge headway = 2.0 seconds.
P(0) = $e^{-\{136\times2/3600\}}$ = 0.9272, and
P(1) = $e^{-\{q\times t/3600\}}$ × { qt/3600}
= $e^{-\{136\times2/3600\}}$ × (136 × 2/3600)
= $e^{-\{0.07555\}}$ × {0.07555} = 0.9272*0.07555 = 0.0701
P(Opposition to Lane shift(ht < 2) = 1−{0.9272 + 0.7001}
= 0.00270, and per Hour (1800,2 sec. intervals/hour)
= 0.00270 × 1800 = 4.869, and thus:
P(SPCO Rt. to Lt. sideswipe/veh) = P(Arrival or lane switch) × P(Opposition to switch)
= 1.0 × 4.869 = 4.869
and finally:
SPCO(Rt. to Lt.sideswipe Conf./hr) (eg., from 100 vph-left turn) =
= Rt. to Lt. Shift/hr × p(SPCO Rt. to Lt. sideswipe/veh)
= 14 vph × 4.869 SPCO Conflict Opportunities/veh
= 68.16 SPCO(Rt. to Lt. Sideswipe Conflict Opportunities/hour)

b. For the Left to Right SPCO on the major approach (360 vph through). These are through vehicles on the major approach which are in the left lane and will enter the right lane depending on the degree of utilization of the left lane for turning:

SPCO(Lt to Rt sideswipe Conf/hr) = Lt to Rt Volume/hr × P(SPCO Side Conflicts/veh)
= 50 vph × P(SPCO Lt. to Rt. Sideswipe Conflicts/veh)
where:
P(SPCO Lt.to Rt. Sideswipe/veh) = P(Arrival or switch)* P(Opposition to switch),
where:
P (Arrival or lane switch) = P (Through Vehicles desire to shift out of Left lane)
= Left Lane Utilization Surrogate (Left Volume/Left Capacity)
= 100 vph/(3600/5.65 sec/veh) = 0.156
where:
5.65 sec/veh is the gap needed to make one left turn from the major to the minor street assuming no opposition to the left turn. This approach ignores the queue buildup in the left lane due to opposition to the left turns (which may not occur at low volume levels). Through volumes in the shared lane are also ignored since all of these may desire to shift out of the shared lane. Any opposition to the left turn or added through traffic in the merge lane will encourage more lane shifting and sideswipe accidents, thus the above lane utilization surrogate is a conservative approach which minimizes lane shifts and sideswipes.
and:
P(Opposition to lane shift) = probability of arrival of 2 or more vehicles in the entry lane in less than 2 seconds during the hour
= P(> = 2) = 1 − {(P(0) + (P(1)}
61
where:
P(0) = $e^{\{-qt/3600\}}$,
where:
q = arrival rate in through lane = 314 vph {310(thru) + 14(1t)vph}, and
t = default merge headway = 2.0 seconds or user input.
= $e^{-\{324\times2/3600\}}$
=e $^{-\{0.1800\}}$ = 0.8352

-continued and:

$P(1) = e^{\{-qt/3600\}} \times \{qt/3600\}$ $= e^{-\{324 \times 2/3600\}} \times \{324 \times 2/3600\}$ $= e^{-\{0.1800\}} \times \{0.1800\} = 0.8352 \times 0.1800 = 0.1503$, and thus P(Opposition to Lane shift($ht < 2$) $= 1 - \{0.8352 + 0.1503\}$ $= 0.0144$, and per hour (1800, 2 second intervals/hour)

$= 0.0144 \times 1800$ $= 25.90$ and since:

P(SPCO Lt. to Rt. sideswipe/veh) = P(Arrival or lane switch) × P(Opposition to switch)

$= 0.157 \times 25.90$ $= 4.066$ and finally:

SPCO(Lt. to Rt.side)/hr (eg., from 100 vph-left turn) =

= Lt. to Rt. Shift/hr*P(SPCO Lt.to Rt. sideswipe Conf/veh)

= 50 vph × 4.066 SPCO sideswipe conflicts/veh

= 203.3 SPCO(Lt. to Rt. Sideswipe Conflict Opportunities/hour)

c. For the Right to Left SPCO on the minor approach (100 vph left). These are left turning vehicles on the minor approach which are in the right lane and must enter the left to turn left.

SPCO(right to left sideswipe)/hour = Rt. to Left Volume/hr × P(SPCO side/veh)

= 14 vph × P(SPCO Rt. to Lt. sideswipe/veh)

where:

P(SPCO Rt. to Lt. sideswipe/veh) = P(Arrival or switch) × P(Opposition to switch), where:

P(Arrival or lane switch) = P(Lane shift)

1.0 (left turn volume must shift left), and

P(Opposition to lane shift) = probability of arrival of 2 or more vehicles in the entry lane in less than 2 seconds during the hour such that:

$P(>= 2) = 1 - \{P(0) + (P(1)\}$ where:

$P(0) = e^{-\{q \times t/3600\}}$ where:

q = average arrival rate in left lane {86 vph}, t = default merge headway = 2.0 seconds.

$P(0) - e^{-\{86 \times 2/3600\}}$ $= e^{-\{0.1555\}} = 0.9534$ $P(1) = e^{-\{q \times t/3600\}}$ $= (e^{-\{86 \times 2/3600\}1}) \times (86 \times 2/3600)$ $= (e^{-\{0.1555\}} \times \{0.04778\} = 0.9533 \times 0.1555 = 0.0455$, and P(Opposition to Lane shift($ht < 2$) $= 1-\{0.9533 + 0.0455\} = 0.0011$, and per hour(1800, 2 sec. intervals/hour) $= 0.0011 \times 1800 = 2.00$ and thus:

P(SPCO Rt.to Lt. sideswipe/veh) = P(Arrival or lane switch) × P(Opposition to switch)

$= 1.0 \times 2.00$ $= 2.00$ and finally:

SPCO(Rt. to Lt.side)/hr (eg., from 100 vph-left turn) =

= Rt. to Lt. Shift/hr × P(SPCO Rt. to Lt. Sideswipe Conf/veh)

= 14 vph × 2.00 SPCO Sideswipe Conflicts/veh

= 28.0 SPCO(Rt. to Lt. Sideswipe Conflict Opportunities/hour)

The sideswipe conflicts from Left to Right are assumed to be zero, since all traffic will be turning left, there is no reason for a normalized driver to switch from the left turn lane to the right lane, and thus no sideswipe accident will occur from left to right traffic on the minor approach. In the above example, the sum of all sideswipe SPCO's is 305.2 total SPCO's per hour.

In a similar manner, each of the movements to and from each of the lanes on each approach are summed to develop an hourly SPCO for all sideswipe maneuvers which may occur and are then summed to generate Total Sideswipe SPCO's for the hour. With the use of k factors (or peak to daily ratios), the Sideswipe SPCO's can be extended to daily and annual Sideswipe Conflict Opportunities. All of the above SPCO generators have also been formatted to generate accidents in a summed 24 hour form using hourly volumes, weekly correction factors, and individual county data to generate approach specific hourly accidents.

4. FIXED OBJECT STATISTICALLY PROBABLE CONFLICT OPPORTUNITY

The use of a rate-based (exposure) fixed object/single vehicle model is a simplification which permits the user to retain relatively realistic accident estimations without undue cost. Where more precise estimation of fixed object accidents is required, roadside data may be collected from photologs or other sources for use with the TRAF-SAFE Program.

As an example, assume an entering flow of 460 vph on the major approach to a stop controlled intersection where 360 vph proceed through and 100 vph turn left from the major approach and 100 vph enter from the minor approach which has stop control. With the total intersection entering flow of 560 vph, from the embedded stop-controlled accident rate models, the accident rate for a stopcontrolled intersection at this volume is 1.15 Accidents/mev-yr. Assuming k=0.10 and 365 days, total annual accidents are:

Accidents/yr =

1.15 *Acc/Mev* * {560 vph * 365}/{0.10 * 1,000,000} = 2.35

Since also from prior research, the percent of fixed object/single vehicle accidents at stop controlled intersections with this volume level is approximately 9 percent or (2.35*0.09) 0.2123 Fixed object/single vehicle accidents for all vehicles are estimated to occur annually for these volumes entering the intersection. Distribution of the fixed object accidents back to entering vehicles results in (360/560*0.2123) 0.136 Accidents/year for the 360 vehicles and 0.038 for the 100 vehicles entering from the major through approach, and also 0.038 fixed object accidents per year for the 100 vph entering from the minor approach. However, since each of the approaches are 2 lanes (24 feet), the fixed object/single vehicle accidents are assumed to occur only to vehicles in the right-most lane, thus all of the annual accident estimates may be divided by 2.0 since 2 lanes exist on each approach.

The use of a rate-based fixed object/single vehicle model is a simplification which permits the user to retain relatively realistic accident estimations without undue cost. Where more precise estimation of fixed object accidents is required, roadside data may be collected from photologs or other sources for use with the TRAF-SAFE Program.

5. CONVERSION TO ANNUAL ACCIDENTS, INJURIES AND FATALITIES

Using the above example, the summarization and conversion of SPCO's to annual accidents, injuries and fatalities is as follows la. Angle = (100 vph left from major street) =

{(14.53*365)/0.10} = 53,064

-continued

1b. Angle = (360 vph thru on major street) =

{(70.93*365)/0.10} = 258,423 lcd Angle = (100 vph left from minor street) =

{(73.30*365)/0.10} = 267,601

2a. Rear = (100 vph left from minor street) =

{(12.87*365)/0.10} = 46,979

3a. Sideswipe = (Rt. − Lt. on Major street) =

{(69.3*365/010)} = 248,772

3b. Sideswipe = (Lt. to Rt. on Major street) =

{(203*365/0.10)} = 742,142

3c. Sideswipe = (Rt. to Lt. on Minor street) =

{(30.2*365/0.10)} = 101,293

Having identified each of the intricate annual Statistically Probable Conflict Opportunities (SPCO's) emanating from individual traffic movements, each of the conflict types must be converted to annual accidents. In this conversion, a common model (AMA Model) is used to define the relationship of annual accidents to SPCO's as:

Annual SPCO Conflict/Accident Ratio=f(Minor Approach Vpd)−f(Major Approach Vpd)+Minor Terms, where for the above example of 460 vehicles per hour (360+100) on the Major approach and 100 vehicles per hour on the Minor stop controlled approach to the intersection and a k factor (peak hour to daily conversion factor) of 0.10, the AMA Model Conflict/Accident ratio would be:

*AMA* Model Annual Conflict/Accident Ratio =

*f*(1000) − *f*(4600) + variable = (233,528 * 5.62476) − (119784) + 0 = 1,193,756

In general and for this example only, the AMA Conflict/Accident Model will require approximately 1.19 million SPCO's between vehicles before 1 accident will occur which can be compared to other conflict to accident studies which suggest opportunities per accident ratios range from 1.4–4.4 million:1 (depending on the type of conflict) indicating that the SPCO conflicts of 1.2 million conflicts:1 accident for this example is reasonable.

To define actual annual accidents among the various conflict types of angle, rear-end, and sideswipe (assuming fixed object/single vehicle conflicts are defined by the default exposure-based model) requires a recognition that rear-end and sideswipe accidents require a speed based adjustment in addition to the volume adjustments provided by the AMA Model. The need for the speed-based adjustment is predicated upon the fact that while angle conflicts occur in full frontal view of each operator, both rear-end and sideswipe accidents occur in peripheral and rear-end views for one or both of the involved drivers. As such, and given the importance of speed in the perception of objects in peripheral or rear-view, a calibration of the AMA model was found desirable for both rear-end and sideswipe conversion of SPCO's to annual accidents. This adjustment was found to follow the form:

AMA Ratio Angle Accidents=AMA Model/1.0, and

AMA Ratio Rear-End and Sideswipe Accidents=AMA Model/f(Speed)

As an example, given the above angle, rear-end and sideswipe conflicts, the following annual accidents are developed:

1a. Annual Angle Accidents/yr = 53,064 SPCO/1,193,756 Conf/Acc
= 0.0485

1b. Annual Angle Accidents/yr = 258,423 SPCO/1,193,756 Conf/Acc
= 0.2165

1cd. Annual Angle Accidents/yr = 267,601 SPCO/1,193,756 Conf/Acc
= 0.2242

2a. Annual Rear-end Accidents/yr

= 46,979 SPCO/1,193,756/(Approach Speed/8)
= 46,979 SPCC/1,193,756/(30/8)
= 46,979 SPCO/318,334 = 0.1476

3a. Annual Sideswipe Accidents/yr

= 248,772 SPCO/1,193,756/(Approach Speed/300)
= 248,772 SPCO/1,193,756/(45/300)
= 248,772 SPCO/7,958,373 = 0.0313

3b. Annual Sideswipe Accidents/yr

= 742,142 SPCO/1,193,756/(45/300)
= 742,142 SPCO/7,958,373 = 0.0933

3c. Annual Sideswipe Accidents/yr

= 101,293 SPCO/1,193,756/(30/300)
= 101,293 SPCO/11,937,560 = 0.0085

In summary, total annual accidents equal:

Angle Accidents/year = 0.485
Rear-end Accidents/year = 0.148
Sideswipe Accidents/year = 0.133
Fixed Object/Single Vehicle Accident/yr = 0.106 or (0.21/2)
Total Annual Accidents = 0.872

Having identified the annual accident estimate of 0.87 accidents per year which are composed of angle, rear-end, sideswipe and fixed object/single vehicle accidents, the next task is to convert the accidents into personal injuries and involvements. To accomplish this, prior research is utilized as presented in FIGS. 17*a* to separate annual accidents first into persons injured and property damage only accidents, and secondly using FIG. 17*b* to separate the persons injured into persons injured fatally and persons injured non-fatally using an Injury/kill ratio, where both models are functions of vehicle speeds. Both FIGS. 17*a* and 17*b* may be converted into mathematical models of the following two forms:

1. Injuries/year=Total Annual Accidents*f(Highest Approach Speed).

Since total annual accidents assume an auto occupancy of approximately 2 persons per vehicle and Fixed Object/Single vehicle accidents generally involve a single occupant, a conservative approach to personal injury and fatality estimation is to eliminate Fixed Object/Single Vehicle accidents from the calculation of annual personal injuries and fatalities. Individual models are also used for speeds above and below 30 miles per hour.

2. Fatalities/year=(Injuries/yr)/f(Highest Approach Speed).

As an example from the above, the annual accident total is 0.87 accidents per year with the highest approach speed of 45 mph and 2.0 persons per vehicle (average auto occupancy in injury crashes =1.9), and eliminating the default Fixed Object/Single Vehicle accidents from Total Annual Accidents, the annual Injuries and Fatalities are estimated as (recognizing that Software round-off may give slightly different answers):

Annual SPCO Accidents = Total Accidents − Fixed Vehicle and Single Vehicle Accidents/yr
= 0.87 − 0.11
= 0.76
Injuries per year
= Annual Accidents × {0.228 + (0.00000003 × Speed$^4$)}
= 0.76 Annual accidents × {0.228 + (0.00000003 × 45$^4$)}
= 0.76 × (0.228 + 0.00000003 × 4100625)
= 0.76 × (0.228 + 0.1230)
= 0.76 × (0.3510)
= 0.26 injuries per year, and
Fatalities/yr = (0.26 Personal Injuries/yr)/{(201 + (0.00000072 × Speed$^4$) − (25.1 × Sqrt (Speed)}
= (0.26 Personal Injuries/yr)/(201 + 2.9 − 168.8)
= (0.26 Personal Injuries/yr)/35.112
= 0.007

In summary, based on the above example, where an intersection with 4600 vehicles per day proceeding in the major direction (3600 through vehicles and 1000 left turning vehicles) at 45 miles per hour is interfered with by 100 vehicles turning left from a two-way stop controlled side-street with an approach speed of 30 miles per hour, 0.87 accidents are estimated to occur each year these volume levels exist, and of these accidents, 0.26 personal injuries will occur each year (approximately 26 injuries in 100 years of operation or 1 every 4 years), which will include 0.007 fatalities per year (0.7 fatalities in 100 years of operation). Since 0.87 accidents occur each year and 0.26 personal injuries (including fatalities) result from these accidents, an estimate of property damage accidents may be deduced as 0.61 property damage only accidents per year. However, given the lack of knowledge of actual auto occupancy and the irrelevance of property damage accidents, this estimate is considered suspect and presented for informational value only.

G. INTERPRETATION OF THE RESULTS—HAZARDS AND THE SAFETY LEVELS OF SERVICE RATINGS

With the calculations completed for the intersection(s) valuable information has been obtained about the particular number of expected annual accidents and personal involvement's which would result from each of the four accident submodel types. However, a standardized interpretation of the results will generate even more useful information for comparing alternative design or operations strategies to reduce accidents and involvement's or for safety program funding studies, etc. By setting a standard against which the results can be compared on a local and national basis, the relative safety of any intersection and/or roadway and the need to improve the conditions can be easily determined. The use of Safety Levels of Service (SLOS) which are composed of both Intersection Safety Levels of Service (ISLOS) and Roadway Safety levels of Service (RSLOS) achieves this purpose.

1. The TRAF-SAFE Program and Safety Levels of Service

Validation of any accident model is made difficult because of the ever-unstable results of actual accident statistics which deal with individual sites. However, validation to other models or to other recognized relationships between accidents, geometry, traffic control types, and traffic volumes can be as good if not better than actual site comparisons because of the removal of site specific human, vehicle and environmental factors. One of the best such sources of generally accepted relationships between traffic volumes, traffic control types, geometry and accidents is the use of the MUTCD Warrants for the installation of Traffic signals.

As a generally accepted source, the MUTCD presents two individual warrants for the installation of a traffic signal at a stop-controlled intersection. One is the Peak Hour Volume Warrant #11 which permits the installation of a traffic signal if the combination of major and minor street volumes and geometry are satisfied for one hour. In a similar manner, Warrant #6 is an Accident Experience warrant which also permits the installation of the same signal if the intersection experiences at least 5 accidents in a 12 month period. Theoretically each of the 5 accidents are supposed to be of a type correctable by the presence of a traffic signal, however, in practice this precision in the definition is often overlooked, or easily subjected to interpretation. Using these two warrants, a surrogate relationship may be presumed to exist such that the peak hour volumes (converted to a daily format), geometry, and stop control are directly related to the development of approximately 5 accidents in any one year. Using each of the corresponding major and minor direction volumes from the Peak Hour Warrant along with assumptions and default values used in the TRAF-SAFE Program, FIG. 18 presents a summary of the annual accidents and personal involvement's over 13 cases for a two-way stop controlled intersection. Recognizing that assumptions related to percentage turning movements and speeds may have moderate sensitivity, the individual results from 3.12 to 7.08 accidents per year and especially the average of 4.91 accidents per year indicate a response which compares extremely well to an MUTCD suggested average of 5.0 accidents per year for these volume levels and geometries. It should be noted that the MUTCD was not used in the calibration of the TRAF-SAFE Program which makes the validation even stronger. Assuming the relationship between MUTCD Warrants is acceptable, this comparison of the TRAF-SAFE Program to the MUTCD appears valid.

A second validation sponsored by the Florida Department of Transportation (FDOT) to 65 two-way stop controlled (TWSC) intersections was also performed. All data was collected by FDOT staff and their consultant from 5 counties in the Greater Tampa Bay area with randomly selected sites from each of 5 Counties and each county having 10–25 intersections within the study group. The sites represented traffic volumes from 3000–71,000 entering vehicles per day with horizontal geometries ranging from 2–6 lane cross-sections both with an/or without left and/or right protected turn bays. All sites were intersections of State Highways with both three and four leg intersections. Traffic volumes for all approaches were composed of both 24 hour and 8 hour turning movement counts, which were statistically modeled to assure conformity between 8 and 24 hour count totals for each approach. Site geometries were field verified including turn bay lengths to account for turn bay back-out. The results of this study accepted by FDOT and presented in FIG. 19 from a slide presentation to the Transportation Research Board's 1996 *National Conference on Access Management* indicate in FIG. 19*a* the distribution of actual average annual accidents versus total entering volumes, and in FIG. 19*b* the TRAF-SAFE Program estimates of annual accidents for each site. The conclusions of this study found that the TRAF-SAFE Program provided responses which were within 3 standard deviations of the actual site accidents 98 percent of the time, within 1 standard deviation 70 percent of the time and within ½ standard deviation of the actual accident average 50 percent of the time. In general, the study concluded the TRAF-SAFE Program provided responses which were superior to even the best statistical approach because the TRAF-SAFE Program automatically eliminated statistical "outliners" (non-responsive data points), and because the Program had a wide variety of data input which permitted development of a "Response Envelope or Surface" as opposed to linear (limited input) non-complex models, and because the TRAF-SAFE Program unlike normal statistics requires no prior knowledge of actual site accidents.

Highway delay and safety levels of service are intersection and roadway operations features which continually change based on location. For example, highway users in New Mexico experience an average fatality rate of 4 fatalities per 100 mvm per year while highway users in Nebraska experience an average of only 1 fatality per 100 mvm per year. Yet to judge each state based on National safety standards would suggest that New Mexico roadways are 4 times more unsafe or hazardous than Nebraska, and thus highway safety funding should go to New Mexico. With that philosophy, there is little incentive to improve safety in Nebraska and possibly even a disincentive to degrade safety to get more federal funding for highway safety.

In a similar manner, congestion management programs based only on a national standard of congestion may also suffer the same fate, because the larger and less dense the city (such as Los Angeles), the more severe the congestion appears by national comparison values, and since the congestion appears more severe, more highway funding will result in more highways for Los Angeles which stretch the city even further out into suburbia maintaining minimal densities. In an endless cycle and with no provisions for funding transfer to non-highway modes, the more highway funding that large non-dense cities receive, the more severe the congestion will become, etc. With that philosophy, large non-dense cities will receive the "cream" of the highway congestion funding which is contrary to the goal of increased urban densification to achieve overall highway congestion reduction. In safety as in delay, the desire to capture Federal Congestion or Safety monies can easily lead to "Catch 22" scenarios where the goal and the philosophy to achieve it are confused because the measuring tools may be both inaccurate and ineffective, and where the solution to the problem of improving highway performance is not in the use of blanket national standards but in a balanced and incremental approach where both national and local perspectives are monitored and examined. In this manner, where Nebraska or New Mexico improve their delay or safety record by 10 percent, thence a 10 percent increase in funding, and a similar loss to funding if standards are not met. From a national perspective, with each highway agency striving to improve local conditions using local yardsticks, the result should be an overall national improvement.

National Standards for speed and delay based performance like the HCM Levels of Service are important first steps in the establishment of local standards from which to judge local performances, and similarly the isolation of both average total and stopped delay, as the prime performance measures for two-way stopped and traffic signal control respectively for intersections, was of singular importance to urban HCM Levels of Service. In the establishment of new Safety Levels of Service (SLOS), one performance measure which appears consistently in the literature is Persons Injured per 100 accidents. For both intersections and roadways, the parameter of persons injured is used as the prime performance measure in the TRAF-SAFE Program and appears as an especially desirable measure of effectiveness given the sensitivity which speed imparts to all accident types. In using the new Intersection (ISLOS) or Roadway Safety levels of Service (RSLOS) according to the present invention, it is important to also understand the symbiotic relationship which is expected at speeds below 60 mph between HCM Levels of Service, congestion (as generally measured by delay) and Safety Levels of Service. In HCM Levels of Service, the Levels of Service increases (improves) with decreasing congestion (which reflects increasing speeds), and similarly in Safety Levels of Service, the Safety Levels of Service should increase (improve) with reduced congestion to reflect gdecreased conflicts and decreased accident occurrences (quantities) which should also reduce injury and fatality involvement's. In other words, at speeds below 60 mph, if there are few vehicles on the roadway, accidents, injuries, and congestion should be minimal with speeds at maximum, and conversely as congestion increases, conflicts, accidents and injuries should be increased.

Recognizing this concept, the following Safety levels of Service are suggested:

a. INTERSECTION SAFETY LEVELS OF SERVICE (ISLOS)

Intersections are developed in a variety of forms which may include driveways for private and commercial properties which have no traffic control (uncontrolled). Within this intersection type, traffic operations may vary annually such that if the driveway serves only 8 AM to 5 PM typical office uses, the driveway may generate traffic only approximately 250 days per year (working days), or even less in the case of sports, cultural and other social facilities. As traffic usage's increase, uncontrolled driveways often "mature" to "Yield", "Stop", "4-Way Stop" and even signalized control types where intersections generally operate 365 days per year.

Prior art has recognized as presented in FIG. 20 that in terms of the quantity of annual accidents at intersections, increasing accidents will result in increasingly effective traffic control types from uncontrolled, to stop control and finally to signalized control with innumerable nuances of phasing and timing control. For "No Control" intersections or driveways, this type of control appears appropriate where no (0) accidents occur within 3 years or where the annual accidents are less than 0.33 per year. For "Yield" controlled intersections, this traffic control type appears appropriate where annual accidents are less than 2 in three years or less than 0.67 per year, and "Stop" sign control appears appropriate generally in excess of 0.67 accidents per year up to approximately the MUTCD warrant level of 5 accidents per year. Using the above as threshold levels assumed equivalent to the LOS E/F (acceptable/unacceptable) threshold from HCM Levels of Service, incremental levels of service from A–F may be developed for each of the above conforming to equidistant ranges as provided by the HCM Levels of Service for Unsignalized Intersections. Each of these threshold levels for accident quantity and incremental levels are presented in FIG. 14. No prior research exists with respect to maximum annual accident (quantity) levels for "All-way Stop" or for signalized intersections.

In terms of the quality (or severity) of annual accidents, no prior research exists to define acceptable severity levels. However, the one event where the quality of the event (accident) is so severe as to be unacceptable is the fatality. Where an individual fatality occurs, it may be said with certainty that had the person known the trip would result in death, there is little doubt the trip would have occurred, unless the intent was fatal which cannot by definition conform to the assumption of a normal driver. Barring intentional fatality, a fatality is one outcome of an accident which is unacceptable under all circumstances, and from this a severity threshold criterion can be established which provides that "No driver or passenger should die as a result of an auto accident in their lifetime". Assuming a conservative lifetime of 100 driving years (approximately 115 years of age) and only one occupant per vehicle (a conservative approach to safety threshold definition), using this definition no intersection should produce an annual fatality estimate which exceeds 0.01 per year or 1 fatality in 100 years of intersection operation. Since from national accident statistics, the average auto occupancy injury accidents is approximately 2.0 and since the fatality:injury ratio is approximately 1:37, and given that the difference between a personal injury and a fatality may be age, heath or more simply "bad luck" dependent phenomena, a more conservative approach to the definition of a safe/unsafe severity threshold is to include not only estimated fatalities but also personal injuries in the threshold definition such that a reasonable threshold for accident Severity may be where estimated annual personal injuries and fatalities exceed 0.75 per year (0.01*2*(37+1)). Using this as the threshold level assumed equivalent to the LOS E/F (acceptable/unacceptable) threshold from HCM Levels of Service, incremental levels of service from A–F may be developed for severity conforming to equidistant ranges as provided by the HCM Levels of Service for Unsignalized Intersections. Each of these threshold levels for quality of accident (severity) and incremental levels are presented in FIG. 14. This quality criterion appears usable for all traffic control types recognizing that the selection of life duration, auto occupants and fatality:injury ratio are roadway and user defined phenomena which will affect the severity threshold definition and subsequent incremental hazard Levels of Service.

Because of the limited experience with safety quantity and quality threshold and incremental Safety Levels of Service, Is engineering caution should be exercised in any field applications, and continuing development may alter the internal structure slightly.

Based on the above example from FIG. 3, where an intersection with 4600 vehicles per day proceeding in the major direction (3600 through vehicles and 1000 left turning vehicles) at 45 miles per hour is interfered with by 100 vehicles turning left from a two-way stop controlled side-street with an approach speed of 30 miles per hour, 0.87 accidents are estimated to occur each year these volume levels exist, and of these accidents, 0.26 personal injuries will occur each year (approximately 26 injuries in 100 years of operation or 1 every 4 years), which will include 0.007 fatalities per year (0.7 fatalities in 100 years of operation). Based on the hazard definitions provided in FIG. 14, this intersection would be defined as "Generally Safe in Accident Ouantity" from the annual accident quantity perspective since total annual accidents are less than 4.5 for a two-way stop controlled intersection, and since the annual quality (severity) of injuries+fatalities (0.26 including 0.007 fatalities) are less than 0.75 per year, the intersection may also be defined as "Generally Safe in Accident Quality". If either the criterion of accident quantity or accident quality had been breached, the intersection may be defined as "Generally Hazardous in Accident Quantity and/or Ouality". In terms of an incremental assessment of safety from FIG. 14, this intersection would be defined as having an Intersection Safety Level of Service –Quantity (ISLOS) of B (>0.50, <1.0 Total Accident per year for Two-way stop controlled), and an ISLOS–Quality of C (>0.15, <0.30 Fatal+Injury Involvements per year), for an overall ISLOS of C (lesser of either the Quantity or Quality criterion).

A second example is presented in FIG. 18 for two way stop controlled intersections using the MUTCD example case studies and average. Based on the use of FIG. 14 to define hazard levels, while several of the intersections have not breached the quantity threshold of exceeding 4.5 accidents per year to warrant a traffic signal installation, at an assumed major roadway speed of 40 mph, all of the intersections breech the quality (severity) criterion of 0.75 annual injuries+fatalities per year indicating a signalized intersection is warranted based on the severity of accidents. On average of all cases, both quantity and quality of accidents exceed threshold levels indicating the average of the stop controlled intersections are "Generally Hazardous" and warrant a change in the traffic control from two-way stop control to a signalized intersection.

Interestingly, a comparison to the delay produced by the HCM procedures indicates most of the intersections are operating at acceptable LOS C, D and E Levels of Service which has been an unexplained dichotomy between the MUTCD and HCM for many years. Clearly the new Intersection Safety Levels of Service help to unravel this dichotomy by recognizing that any threshold is composed of both delay and safety criterion (even where the safety criterion is unmeasured as with the HCM LOS Levels), and violation of responses to safety thresholds generally do occur before delay thresholds are reached otherwise there would be no need for drivers to speed or to accept unsafe maneuvers "just to get ahead in traffic" and minimize their traveltime at the expense of safety. In the FIG. 18 examples, if the average intersection were operating at the HCM LOS E/F delay-based threshold, then safety levels would already have been exceeded which appears to be a typical operation for many congested intersections such as these in Cases 1–13.

b. ROADWAY SAFETY LEVELS OF SERVICE—RSLOS

Roadway Safety Levels of Service are a function of the environment such that safety depends on the surrounding. For example, a driver on a New Jersey local road with an average fatality rate of 3.89/100 mvm would probably not feel unsafe on a similar Florida local road even though the Florida roadway has an average fatality rate of 12.25/100 mvm (actual statistics). While it's easy to superficially conclude that Florida local roadways are 3 times more hazardous in fatalities than New Jersey local roadways, if the Florida driver felt unsafe, speeds would be decreased resulting in decreased fatality rates with Florida rates approaching New Jersey rates. But they do not, because drivers in Florida are routinely willing to trade safety for reduced delays or for something else. In Florida for example, the average driver may be accepting 12.25 fatalities/100 mvm because they can reduce delay with higher speeds resulting in more fatalities/mvm. But in New Jersey, the tradeoff may be different for some reason resulting in a much reduced fatality rate. To try and explain why this occurs is irrelevant and probably unexplainable (e.g., people value their life more in New Jersey?, drivers don't fear death in Florida?), but clearly some trade-off is being made such that each area accepts the safety levels which presently exist or they wouldn't exist. Thus to set proper Roadway Safety Levels of Service (RSLOS) standards for both New Jersey and Florida, the standards must be "tailored" to the environment in which the driver is operating because of the geometric, environmental or other constraints placed on the driver in the particular environment which affects both fatality and injury occurrences.

To accomplish this "tailoring to the environment", the TRAF-SAFE program uses a linear relationship between existing Fatal and Injury Involvement Rates and injury rates developed from use of the TRAF-SAFE program. The form of the Roadway Safety Level of Service (RSLOS) model is as follows:

$$\frac{\text{TRAF-SAFE Personal Injuries}}{\text{“Safety Capacity” Personal Inj.}} = \frac{\text{TRAF-SAFE Roadway Total Injury Rate}}{\text{State-Local Roadway Total Injury Rate}}$$

where:

TRAF-SAFE Personal Injuries=the "unknown" annual personal injuries (fatal+non-fatals/100 accidents/mvm) placed on the basis of "Safety Capacity" of the roadway which is used to enter either Rural or Urban (Class I,II or III) Safety Level of Service Tables FIGS. 22–25 and establish the alphabetic RSLOS value (RSLOS A–F).

"Safety Capacity" Personal Injuries=the maximum number of personal injuries/100 accidents/mvm permitted at the assumed boundary of Safety Level of Service E/F. In essence, any more personal involvement's than this threshold is considered to be in Level of Service F and defined as unacceptable, "Hazardous" or "Unsafe". Prior research indicated that for Rural conditions, this boundary exists at 1300 persons injured/100 accidents/mvm with other Rural Safety LOS Levels as presented in FIG. 22. For Urban areas, the Safety Capacity is dependent on the environment as defined by HCM Class I, II, or III conditions as presented in FIG. 23–25. The urban boundaries were developed using extensive comparisons of the relationship of the TRAF-SAFE Program to the HCM Chapter 11 (Arterials) under the assumption that the prior researched volume/capacity ratios which created Safety LOS boundaries in Rural areas are transferable to urban areas as well. In other words, as congestion becomes worse, drivers' safety response to congestion is the same in urban areas as it is in rural. Even with the scare research in these areas, this assumption appears reasonable. The urban "Safety Capacity" model developed from the comparisons of HCM arterial speeds to TRAF-SAFE Program accidents and injuries suggests LOS E/F boundaries of 175 persons injured per 100 accidents per mvm for an urban Class I roadway, 300 on Class II roadways, and 490 persons injured/100 accidents per mvm on Class III roadways. It may be noted that extension of the Urban "Safety Capacity" model to its limiting conditions at a speed of 0 produced a "Safety Capacity" of 1350 similar to the Rural model of FIG. 22, indicating that in theory an upper limit to safety conditions exists, such that when approximately 1300 persons injured/100 accidents/mvm (or its theoretical equivalent at congested speeds such as 175, 300, or 490) occurs, the roadway requires improvement to a better standard.

TRAF-SAFE Roadway Total Injury Rate is the sum total of all annual fatal and non-fatal injuries expected by the TRAF-SAFE Program to occur over a defined roadway segment including both intersection and non-intersection related involvement's per mvm. The TRAF-SAFE Program from analysis of each intersection has already estimated the injury involvement's at each intersection. Given these intersection related involvement's which are then segregated to those involved on the major and minor roadways respectively (rear-end, sideswipe and fixed object accidents on the minor approach cannot contribute to involvement's on the major roadway) and local or state data of the percent of intersection injury involvements to total injury involvements, the intersection related injuries are converted to total roadway segment injuries. This percentage is a simplification since the present TRAF-SAFE Program does not include Non-Intersection Models. One would appreciate that, the FHWA "Roadside" or another Model could be used in part in the TRAF-SAFE Program to more precisely assess non-intersection accidents and injury involvement's.

State/Local Roadway Total Injury Rate=The Injury Rate (fatal plus non-final from published sources such as USDOT-FHWA's annual publication of Fatal and Injury Accident Rates. This represents the "Capacity Rate" of the roadway to correspond with the "Safety Capacity" from above. In essence, this rate establishes a direct relationship between the exiting injury rate in a particular State or area for a particular roadway type and the "Safety Capacity." As an example, given an existing New Jersey rural, local road with 399 persons injured (fatal+non-fatal)/100 mvm, the "Safety Capacity" of this roadway would be 1300 persons injured/100 mvm which would also be the "Safety Capacity" of a Florida local, rural roadway even though the existing Florida roadway has 577 person injured/100 mvm. This in effect says both the New Jersey and Florida local, rural roadways are operating at their respective maximum safety rate (equivalent to LOS E/F boundary) even though the two roadways are distinctly different by published injury rates. The difference between the two injury rates being caused primarily by environmental factors associated with drivers, the roadway geometry and the environment.

c. CALCULATION OF ROADWAY SAFETY LEVELS OF SERVICE

In completing the calculations according to the flow chart, the total SPCOs for each accident model are summed to give the total SPCOs for the intersection and is entered into block 1320. By referring to prior art of the relationship of injury-:accident ratios and injury:fatality ratios as functions of speed in FIG. 17, the number of injury involvements, and those involving property damage are calculated. By a similar conversion, the number of fatalities from total injuries can be determined to approximate the expected levels of loss at the intersection.

This data can be useful in government predictions of relative monetary costs of the intersections, by assigning to each level of loss (injury, fatality, and property damage) a monetary cost. By multiplying the loss level by its respective monetary cost, the total annual cost associated with the intersection can be determined.

The total fatal and injury involvements are then re-summed and entered into block 1411. By comparing the annual number of accidents as well as the annual number of injuries and fatalities to a defined safety level number, the safety level of the intersection can be determined.

If the roadway includes more than one intersection, then the number of fatal and non-fatal injury involvements for each individual intersection can be summed to provide the total raw roadway injury and fatality involvements recognizing that only injuries and fatalities which occur on the major roadway will be included. This total is entered into block 1430 along with other road way data including the length of the roadway segment and the number of traffic signals per mile to determine the total number of roadway injury and fatality involvements for the route (composed of multiple intersections), the combined fatalities and injuries for the roadway, and the Roadway Safety Level of Service (RSLOS).

The total number of Roadway fatal and non-fatal injury involvements per amount of travel performed is calculated in block 1430 as the result of several variables. The TRAF-SAFE personal injuries (or roadway fatality and injury involvements) is equal to the "raw" roadway injury and fatality involvements multiplied by the "Safety Capacity Personal Injuries" and divided by the "State or Local Total Injury Rate". The State or Local Injury rate is the empirical data collected at the intersection or experienced in the local area as a correction factor, but is preferably tabulated according to data provided by the FHWA as discussed above. The rate is dependent on the average traffic flow volume along the major roadway and the length of the roadway, which is determined by summing the spacing between the intersections.

As an example, assume each of the 13 cases from the MUTCD example of FIG. 18 are a stop controlled intersection which contain fatal and non-fatal injuries at each intersection, and that the roadway is a Federal-Aid Primary Rural Highway in Florida which has an "existing" involvement rate of 289.42 personal fatal and non-fatal injuries per 100 mvm from published sources (289.42 per 100 accidents/mvm). The first intersection of Case 1 has 4.5 annual accidents which result in 1.22 fatal and non-fatal injuries per year. Of these 1.22 personal involvements, 0.41 occur on the major roadway from angle, sideswipe, rear-end and fixed object/single vehicle accidents and 0.53 occur on the minor roadway from angle conflicts with minor roadway rear-end, sideswipe and fixed object/single vehicle accidents which are omitted. Since from other published sources (Florida Rural Highway statistics) 59.75 percent of all rural injuries are intersection related, 0.84 (0.41+0.53) fatal and non-fatal injuries are assumed to represent 59.75 percent of total injuries. Thus intersection #1 and its surround on the major route will generate 141.4 injuries (fatal+non-fatal) per 100 accidents ((0.84*100)/0.5975). In the same manner, all of the 13 intersections summed will produce in total 2393 injuries per 100 accidents.

Assuming an average 2-way volume on the roadway of 1020 vph or 10,200 vpd using a "K-factor" of 0.10 for 365 days, and all intersections spaced within 2.25 miles (average separation of 910 feet), the travel on the 2.25 mile segment={(10,200 vpd*365 days/yr)*2.25 miles}/1000000=8.376 mvm and thus the TRAF-SAFE Roadway Total Injury Rate={2393 personal injuries (fatal+non-fatal)/8.376 mvm}=285.7 PI/100 accidents/mvm.

With the TRAF-SAFE Roadway Total Injury Rate, the TRAF-SAFE Personal Injuries for the entire route can be defined as:

$$\frac{\text{TRAF-SAFE Personal Injuries}}{\text{"Safety Capacity" Personal Inj.}} = \frac{\text{TRAF-SAFE Roadway Total Injury Rate}}{\text{State-Local Roadway Total Injury Rate}}$$

$$\{\text{TRAF-SAFE Personal Injuries } (X)\}/\{(1300) * \text{"Safety Capacity-Rural"}\} = (285.7)/(289.42) =$$

$$\{(285.7) * (1300)\}/(289.42) = 1283 \text{ Injuries/100 accidents}/mvm$$

From FIG. 22 for Rural roadways, an injury rate of 1283 would indicate a Roadway Safety Level of Service (RSLOS) of E ("Generally Acceptable Hazard Level") would be appropriate to this segment(>1100, <1300). However, if the total length of the segment were reduced to 2.00 miles (average spacing 810 feet), the RSLOS would degrade to RSLOS F or a "Generally Unacceptable Hazard Level". The roadway may even be defined as "Unsafe" should an on-site review of the intersections and roadway by a qualified professional engineer determine that the assumptions of the TRAF-SAFE Program do not appear violated and that in their professional opinion the roadway is "Unsafe".

2. ACCESS MANAGEMENT SAFE INTERSECTION SPACING

Finally, the proximity of one intersection or driveway to another was presumed in the above to be adequate such that each intersection is operating independently from others and that left and right turn bays and acceleration/deceleration lengths are sufficiently long. If bay or acceleration lengths conflict with adjoining driveways of intersections, or if the distances between adjacent intersections or driveways are inadequate, the above accident expectancies can be compounded many times. Thus each bay and accel/decel length and the distance to adjacent intersections and/or driveways must be evaluated. The modeling of each of these features which are Access Management techniques are also incorporated as an executable option into the TRAF-SAFE Program.

Access Management ensures that the location of other access points are not so closely spaced that:

1. Each vehicle entering the main roadway and proceeding to the right (right-out) will not improperly impede a vehicle proceeding on the mainline (in the right through lane) before another vehicle entering from a new location on the right may enter; or there must be enough distance between intersections for a right entering vehicle to accelerate to an acceptable speed and match the mainline deceleration speed before another vehicle can enter and proceed to the right,
2. Each vehicle entering the main roadway from an intersection or driveway and proceeding to the left (left-out) will not improperly impede a vehicle proceeding on the mainline (in the left through lane); or there must be enough distance between intersections such that the mainline vehicle will not improperly decelerate to accommodate the left out vehicle, and,
3. Each vehicle following a lead vehicle (which is decelerating to turn right into an intersection or driveway) will not be interrupted or distracted by the presence of another entering or exiting vehicle between the lead and following vehicles.

In the TRAF-SAFE Program, for driveways on the near side of an intersection (approaching the intersection), the minimum distance between access points is determined as the greater of the following four distances:

1. The difference between the distance required for the through vehicle to decelerate (including perception/reaction) and the distance for the accelerating vehicle (right out from driveway) to meet each other at a downstream location where the decelerating and accelerating speeds match each other, or
2. The through deceleration distance required during the time a left out vehicle requires to accelerate and clear the mainline roadway approach lane where the decelerating vehicle is assumed to be located in the far left lane, or
3. The deceleration distance (including perception/reaction) required for a following vehicle to decelerate and meet the lead right turning vehicle at a clearance point (including the time required for the turning vehicle to clear the mainline through lane), where the clearance point is a function of the radius used and the deceleration rate in the radius, and
4. In addition, each far-side (leaving intersection) driveway must also be evaluated for adequate distance to protect from accelerating right turn vehicles whose turning speed is also a function of the radius used in the quadrant.

For driveways on the far side of the intersection, the minimum spacing to the next entrance is determined in exactly the same manner as the above with the added test that if the right entering vehicle from the intersection has a large radius with which to enter the through roadway, then depending upon the speed of entry into the roadway, the distance to the far driveway may be controlled not by a right or left turn out from the driveway, or decelerating right entering vehicles (these may be restricted), but by entry speed from the minor (right) leg of the intersection itself.

This test requires the determination of the entry and exit speeds into the far side right radius, and given the exit speed, the distance to the next driveway is determined in a manner similar to the above.

As an aid to the above models, the Access Management portion of the TRAF-SAFE Program permits the use of default acceleration and deceleration rates for each approach where the user need only select the design vehicle type (for acceleration entry from the driveway) with deceleration rates based upon the degree of pedal braking in through vehicle deceleration. The degree of pedal braking in through vehicle deceleration (none, light, or heavy) is used interchangeably as a surrogate for the functional classification of each roadway. No pedal braking (coasting only) represents the preferred deceleration of a through vehicle in the presence of an entering driveway vehicle on an Arterial roadway.

Light pedal Braking represents the preferred deceleration of a through vehicle in the presence of an entering driveway vehicle on a Collector roadway. And heavy pedal Braking represents the preferred deceleration of a through vehicle in the presence of an entering driveway vehicle on a Local roadway. In general, the three assumed states of pedal braking (none, light, and heavy) represents the design willingness of the through driver to decelerate in the presence of an entering vehicle. In general, the default decelerations are 2.9 feet/sec. on Arterials, 5.6 feet/sec. on Collectors, and 8.5 feet/sec. on Local roads all at 25 mph from prior research, or each deceleration (as well as acceleration) may be user defined. As the speed increases, each of these deceleration rates decrease to conform with research of the relationship between speed and accel/decel rates. This concept also allows the use of a local access lane adjacent to the mainline lane on an arterial highway which will permit driveways to exist at special isolated corner properties such as Gas Station entrances.

H. IMPLEMENTATION OF THE MODEL

Figure 1:
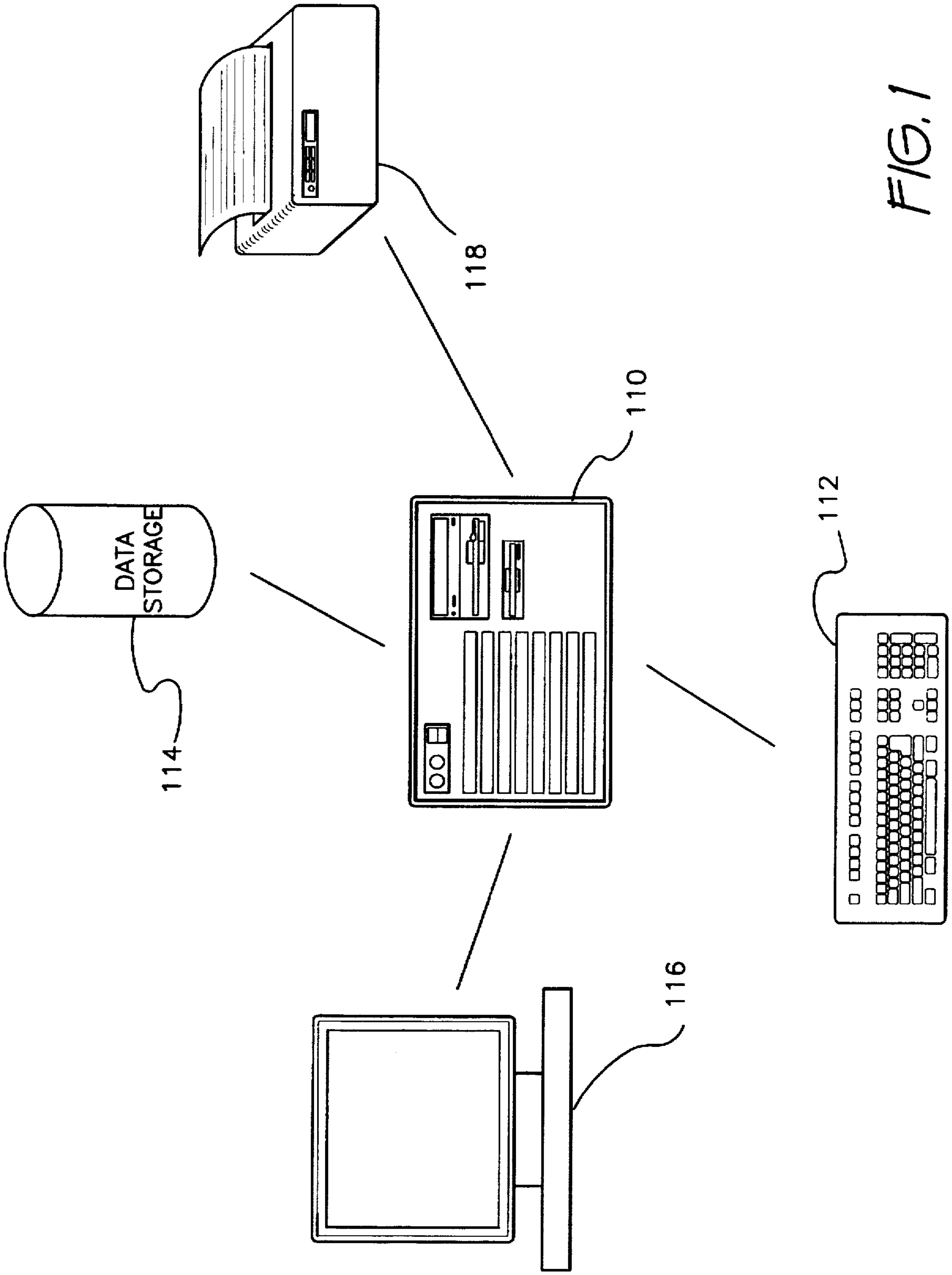
FIG. 1 is diagrammatic view of the device according to the present invention.

Because the calculations are based on a reiterative process, storage of the variables in a database for subsequent combination according to the various permutations discussed at length above are best implemented by a computational device. FIG. 1. shows a setup consisting of a data entry means which can be a keyboard or remote input from site (intersection) based collection means, and a central processor for performing calculations, input/output, and storage functions. Various output means including graphic monitors and printers can be used to produce interpretable facsimiles of the results.

According to the present invention, the inputted data is stored in data storage, along with tables of critical gap periods, levels of service, lane distributions and injury/fatality ratio tables. The data can be selectively retrieved as input to be placed into the data blocks of the model as diagrammed in FIGS. 4–15. The output as shown in part in FIGS. 21A–21B provides the results as both annual expected accident numbers and severities and as a relative rating of SLOS. The collective value of the information provides the user with a tool for determining the relative and expected safety of an intersection or roadway. By changing the values according to proposed or actual design changes, the relative improvement to the intersection and roadway can be determined.

The use of a computer or other calculating means with a large database capacity will greatly simplify implementation of the reiterative process shown in FIGS. 4–15. After data collection on a particular intersection or roadway has been completed by appropriate sensing or sampling means, the data can be entered by keyboard 112 (FIG. 1) into a data storage device 114 through a central processing unit 110. A program can be stored also which completes the reiterative calculations diagrammed in FIGS. 4–15 and can be run by the CPU 100 to determine the total number of conflicts, accidents and severities expected at an intersection or roadway and generate appropriate Levels of Service for the intersection or roadway. Output of the calculated results can occur in numerous formats including monitor display 116 or a hardcopy printing by a suitable printer 118.

According, it is to be understood that the present invention is not limited to the sole embodiment described above, but encompasses any and all embodiments within the scope of the following claims.

I claim:

1. An apparatus for determining a level of safety for a roadway having a traffic flow and an opposition flow and at least one intersection, wherein each intersection includes a plurality of approaches, each approach having at least one lane, each lane having at least one traffic control device, and each traffic control device having at least one mode chosen from the group consisting of stop mode, caution mode, and go mode comprising:

data storage means for storing traffic flow information, opposition flow information, intersection and roadway data, and a conflict to accident ratio;

input means for entering information into said data storage means;

a processor including a first and a second mathematical component for processing said data to yield processed data;

output means for displaying said processed data; and a data bus connecting said input means, said output means, said data storage means, and said processor;

wherein said first mathematic component calculates a total expected number of conflicts between the traffic flow and the opposition flow for each intersection along the roadway; and wherein said second mathematical component computes an expected number of accidents for each intersection along the roadway by dividing said number of conflicts by said conflict to accident ratio.

2. The apparatus of claim 1, further comprising:

said data storage means further including a table of injury to accident ratios and average intersection speeds; and said processor including a third mathematical component for determining an average intersection speed from the traffic flow data in said data storage means and selecting one of said injury accident ratios corresponding to said average intersection speed, and multiplying said expected number of accidents for each intersection along the roadway by said injury to accident ratio to determine an expected number of property damage and injury involvements for each intersection along the roadway.

3. The apparatus of claim 2, further comprising:

said data storage means further including an injury to kill ratio;

and said processor including a fourth mathematical component for multiplying said expected number of injury involvements for each intersection along the roadway to determine a number of fatal and non-fatal injury involvements.

4. The apparatus of claim 3, further comprising:

said data storage means further including a conversion table of total non-fatal and fatal injury involvements to Intersection Safety Level of Service ratings; and said processor includes a fifth mathematical component for entering said number of fatal and non-fatal injury involvements into said conversion table and retrieving a corresponding Intersection Safety Level of Service.

5. The apparatus of claim 4, further comprising:

said processor further including a sixth mathematical component for summing said fatal and non-fatal injury involvements for each of the intersections to produce a roadway total number of fatal and non-fatal injury involvements.

6. The apparatus of claim 5, further comprising:

said data storage means further including roadway conversion tables having a plurality of roadway total number of total injury involvements, a plurality of roadway classifications, and a plurality of roadway safety levels of service; and said processor including a seventh mathematical component for entering said roadway total number of fatal and non-fatal injury involvements, a roadway classification, and retrieving a corresponding one of said plurality of roadway safety levels of service.

7. The apparatus of claim 6, further comprising:

said processor further including an eighth mathematical component for calculating a minimum safe distance spacing between the intersections.

8. The apparatus of claim 7, said input means further including means for sensing traffic flow.

9. The apparatus of claim 8, said traffic flow sensing means being a photolog.

10. The apparatus of claim 1, further comprising:

said data storage means including a table of injury to accident ratios and average intersection speeds, and further includes a conversion table of total non-fatal and fatal injury involvements to Intersection Safety Level of Service ratings;

said processor including a third mathematical component for determining an average intersection speed from said traffic flow information in said data storage means and selecting one of said injury accident ratios corresponding to said average intersection speed, and multiplying said expected number of accidents for each intersection along the roadway by said injury to accident ratio to determine an expected number injury involvements for each intersection along the roadway;

and said processor including a fourth mathematical component for entering said number of fatal and non-fatal injury involvements into said conversion table and retrieving a corresponding Intersection Safety Level of Service rating.

11. An apparatus for determining a level of safety for a roadway having a traffic flow and an opposition flow and at least one intersection, wherein each intersection includes a plurality of approaches, each approach having at least one lane, each lane having at least one traffic control device, and each traffic control device having at least one mode chosen from the group consisting of stop mode, caution mode and go mode comprising:

input means for entering traffic flow and opposition flow information;

data storage means for storing traffic flow information, opposition flow information, and intersection and roadway data;

a processor to yield processed data;

output means for displaying said processed data; and a data bus connecting said input means, said output means, said data storage means, and said processor;

wherein said first processor calculates an total expected number of accidents between the traffic flow and opposition flow for each intersection along the roadway.

12. A method for determining a level of safety for a roadway having a traffic flow and an opposition flow and at least one intersection, wherein each intersection includes a plurality of approaches, each approach having at least one lane, each lane having at least one traffic control device, and each traffic control device having at least one mode chosen from a stop mode, caution mode, and go mode, comprising the steps of:

providing a processor, input means, output means, and data storage means;

providing a data bus connecting the input means, the output means, the data storage means, and the processor;

providing a conflict to accident chart which includes a conflict to accident factor for traffic flow rates through the intersection; and determining a number of conflict opportunities for each of four accident models, wherein the four accident models include angle collision, rear-end collision, side-swipe collision, and fixed object collision models.

13. The method of claim 12, further comprising the step of calculating the total expected number of conflicts as a sum of four accident model conflicts, selected from the group consisting of angle accident, rear-end accident, side-swipe accident, and fixed-object object accident model conflicts.

14. The method of claim 13, further comprising the step of calculating at least one of the four accident model conflicts as a sum of conflicts calculated for each of the traffic control modes.

15. The method of claim 14, further comprising the step of calculating a number of conflicts expected during at least one mode of the traffic control device as a sum of conflicts expected for each lane of each approach.

16. The method of claim 15, further comprising the step of calculating a number of conflicts expected for at least one lane of one approach as a sum of conflicts caused by opposition flow in each opposition lane of each opposition approach.

17. The method of claim 16, further comprising the step of calculating the conflicts caused by the opposition flow of each opposition lane of each opposition approach as a product of the number of arrivals per time period of traffic flow in the traffic flow lane and the probability of conflict between the arrival and opposition flows during the time period that the arrival flow is exposed to conflict from the opposing flow.

18. The method of claim 17, further comprising the step of calculating the probability of conflict between the arrival and opposition flows from the opposition lane as the product of the probability of an arrival of a vehicle in at least one lane of one approach during a time period defined by the duration of the arrival time, and the probability of opposition to the arrival in the opposition lane from at least one lane of one approach during the time period which the arrival vehicle requires to complete the arrival maneuver.

19. The method of claim 18, further comprising the step of calculating the probability of arrival of a vehicle in at least one lane of one approach as a negative binomial distribution.

20. The method of claim 18, further comprising the step of calculating the probability of arrival of a vehicle in at least one lane of one approach as a negative binomial distribution as e (natural logarithmic base) raised to power of {(arrival flow rate in the arrival lane)*(duration time of arrival traffic flow lane)/(−3600)}.

21. The method of claim 18, further comprising the step of calculating the probability of opposition to the arrival in the opposition lane as a negative binomial distribution as e (natural logarithmic base) raised to power of {(opposition flow rate in the opposition lane)* (exposure time of traffic flow to opposition lane)/(−3600)}.

22. The method of claim 12, further comprising the steps of:

providing means for sensing traffic flow chosen from the group consisting of photologs, photosensors, pressure cables, and tabulators;

providing a critical gap chart which includes the exposure time for a vehicle for given intersection dimension data;

providing an injury ratio chart which includes a number of fatalities, injuries, and property damage involvements per number of accidents;

providing an ISLOS chart which includes an ISLOS letter rating for an intersection for total accidents, injury and fatality involvement quantities;

providing a RSLOS chart which includes a RSLOS letter rating for a roadway for total injury and fatality involvement quantities for each of four classes of roadway;

calculating each of the four accident models as a sum of conflict opportunities occurring during the stop modes, caution modes, and go modes of the traffic control devices;

calculating a number of conflicts during the stop modes, caution modes, and go modes for traffic control devices, as a sum of conflict opportunities occurring for traffic flow in each lane of each approach;

calculating a number of conflict opportunities occurring for traffic flow in each lane of each approach as a sum of conflict opportunities caused by opposition flow in each lane of each approach, wherein a conflict opportunity for one lane of traffic flow versus one lane of opposition flow is calculated as follows:

conflict opportunity=(Probability of Opposition from the Opposition flow)* (Probability of Arrival flow) *(Number of arrivals per time period of traffic flow in the traffic flow lane);

calculating a Probability of Opposition from the Opposition flow as a negative binomial distribution as e (natural logarithmic base) raised to power of {(opposition flow rate in the opposition lane)* (exposure time of traffic flow to opposition lane)/(−3600)};

referring to the conflict to accident chart to determine a conflict to accident ratio for the traffic flow through the intersection;

calculating a probability of arrival flow as a negative binomial distribution as e (natural logarithmic base) raised to power of {(arrival flow rate in the arrival lane)*(duration time of arrival traffic flow lane)/(−3600)};

calculating the total number of accidents by dividing the number of conflict opportunities by the conflict to accident ratio;

referring to the injury ratio chart to determine a number of fatalities, injuries, and property damage involvements for the total number of accidents;

referring to the ISLOS chart to determine the ISLOS safety rating for the number of accident, injury and fatality involvements;

determining a number of roadway accidents as a sum of total accidents for each intersection on the roadway;

determining a number of roadway injury and fatality involvements as the sum of injury and fatality involvements for each intersection along the roadway; and referring to the RSLOS chart to determine an RSLOS safety rating for the number of roadway injury and fatality involvements.

* * * * *